US010066086B2

(12) United States Patent
Rentsch et al.

(10) Patent No.: US 10,066,086 B2
(45) Date of Patent: Sep. 4, 2018

(54) SURFACE TREATMENT OF WHITE MINERAL MATERIALS FOR APPLICATION IN PLASTICS

(71) Applicant: Omya International AG, Oftringen (CH)

(72) Inventors: Samuel Rentsch, Aarburg (CH); Matthias Buri, Rothrist (CH); Patrick Arthur Charles Gane, Rothrist (CH)

(73) Assignee: Omya International AG, Oftringen (CH)

( * ) Notice: Subject to any disclaimer, the term of this patent is extended or adjusted under 35 U.S.C. 154(b) by 316 days.

(21) Appl. No.: 14/763,663

(22) PCT Filed: Feb. 17, 2014

(86) PCT No.: PCT/EP2014/053036
§ 371 (c)(1),
(2) Date: Jul. 27, 2015

(87) PCT Pub. No.: WO2014/128087
PCT Pub. Date: Aug. 28, 2014

(65) Prior Publication Data
US 2016/0115302 A1    Apr. 28, 2016

Related U.S. Application Data

(60) Provisional application No. 61/771,110, filed on Mar. 1, 2013.

(30) Foreign Application Priority Data

Feb. 22, 2013    (EP) .................................... 13156349

(51) Int. Cl.
*C08K 9/04*    (2006.01)
*C09C 3/08*    (2006.01)
(Continued)

(52) U.S. Cl.
CPC ................. *C08K 9/04* (2013.01); *C08J 5/18* (2013.01); *C08K 5/49* (2013.01); *C09C 3/08* (2013.01); *C08J 2323/06* (2013.01)

(58) Field of Classification Search
CPC .................................... C08K 9/04; C09C 3/08
See application file for complete search history.

(56) References Cited

U.S. PATENT DOCUMENTS 3,897,519 A    7/1975    Hogberg et al.
4,115,483 A *  9/1978    Davis ...................... C07F 9/025
                                                             558/114

(Continued)

FOREIGN PATENT DOCUMENTS

CN    101260249 A    9/2008
EP    0325114 A2     7/1989
(Continued)

OTHER PUBLICATIONS

Lee Ching Shya, University Putra Malaysia Master's Thesis, Jan. 2008.*
(Continued)

*Primary Examiner* — Vickey Nerangis
(74) *Attorney, Agent, or Firm* — Amster, Rothstein & Ebenstein LLP

(57) ABSTRACT

The present invention relates to a polymer composition comprising at least one polymeric resin and from 0.1 to 95 wt.-% of at least one surface reactive white mineral material, a process for preparing a surface reactive white mineral material, a surface reactive white mineral material obtainable by the process, a fiber and/or filament and/or film and/or thread and/or breathable film comprising the polymer composition and/or the surface reactive white mineral material, an article comprising the polymer composition and/or the surface reactive white mineral material and/or the fiber and/or filament and/or film and/or thread and/or breathable
(Continued)

film as well as the use of a phosphoric acid ester blend for decreasing the hydrophilicity and/or moisture pick up susceptibility of the surface reactive white mineral material-containing particle surface.

22 Claims, 1 Drawing Sheet

(51) Int. Cl.
*C08K 5/49* (2006.01)
*C08J 5/18* (2006.01)

(56) References Cited

U.S. PATENT DOCUMENTS

| | | |
|---|---|---|
| 4,126,650 A | 11/1978 | Via et al. |
| 4,350,645 A | 9/1982 | Kurosaki et al. |
| 4,407,986 A | 10/1983 | Nomura et al. |
| 4,520,073 A | 5/1985 | Randolph et al. |
| 4,921,990 A | 5/1990 | Uphues et al. |
| 5,135,967 A | 8/1992 | Aumann et al. |
| 5,554,781 A | 9/1996 | Reierson |
| 6,710,199 B2 | 3/2004 | Tsuyutani et al. |
| 8,920,550 B2 * | 12/2014 | Suau .................. C09C 1/62 106/2 |
| 2002/0102404 A1 | 8/2002 | Nakai et al. |

FOREIGN PATENT DOCUMENTS

| | | |
|---|---|---|
| EP | 2377900 A1 | 10/2011 |
| GB | 2336366 A | 10/1999 |
| JP | S5245644 A | 4/1977 |
| JP | H02252742 A | 10/1990 |
| WO | 9292587 A1 | 2/1992 |
| WO | 0000553 A1 | 1/2000 |
| WO | 0020336 A1 | 4/2000 |
| WO | 0132787 A1 | 5/2001 |
| WO | 03082966 A1 | 10/2003 |
| WO | 2004041919 A2 | 5/2004 |
| WO | 2005011851 A2 | 2/2005 |
| WO | 2008023076 A1 | 2/2008 |
| WO | 2008077156 A1 | 6/2008 |
| WO | 2008125955 A1 | 10/2008 |
| WO | 2010023144 A1 | 3/2010 |
| WO | 2011147778 A1 | 12/2011 |
| WO | 2011147802 A1 | 12/2011 |

OTHER PUBLICATIONS

Lee Ching Shya, University Putra Malaysia Master's Thesis (full copy), Jan. 2008.*
Machine translation of JP 52-045644 A, published Apr. 11, 1977. (Year: 1977).*
International Search Report dated Apr. 7, 2014 for PCT Application No. PCT/EP2014/053036.
Written Opinion of the International Searching Authority dated Apr. 7, 2014 for PCT Application No. PCT/EP2014/053036.

* cited by examiner

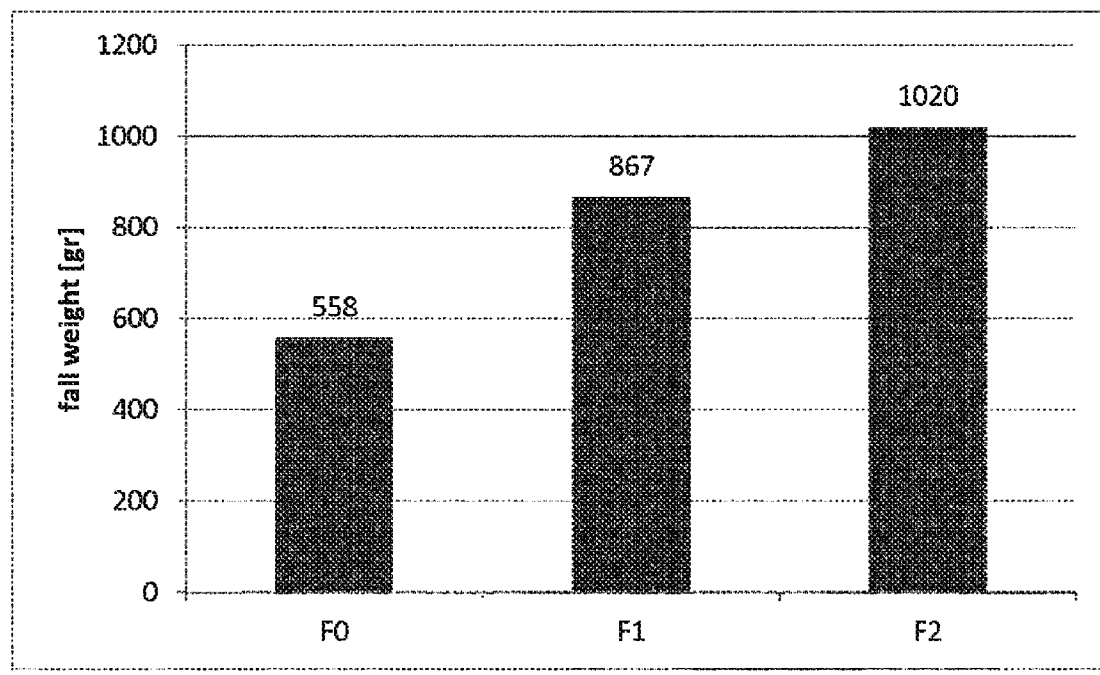

SURFACE TREATMENT OF WHITE MINERAL MATERIALS FOR APPLICATION IN PLASTICS

CROSS-REFERENCE TO RELATED APPLICATIONS

This is a U.S. national phase of PCT Application No. PCT/EP2014/053036, filed Feb. 17, 2014, which claims priority to European Application No. 13156349.6, filed Feb. 22, 2013 and U.S. Provisional Application No. 61/771,110, filed Mar. 1, 2013.

The present invention relates to a polymer composition comprising at least one polymeric resin and from 0.1 to 95 wt.-% of at least one surface reactive white mineral material, a process for preparing a surface reactive white mineral material, a surface reactive white mineral material obtainable by the process, a fibre and/or filament and/or film and/or thread and/or breathable film comprising the polymer composition and/or the surface reactive white mineral material, an article comprising the polymer composition and/or the surface reactive white mineral material and/or the fibre and/or filament and/or film and/or thread and/or breathable film as well as the use of a phosphoric acid ester blend for decreasing the hydrophilicity and/or moisture pick up susceptibility of the surface reactive white mineral material-containing particle surface.

In practice, filler materials and especially calcium carbonate-containing filler materials are often used as particulate fillers in thermoplastic polymer products, like fibers, filaments, films, threads and/or breathable films, usually made of polyethylene (PE), polypropylene (PP), polyurethane (PU), polyvinylchloride (PVC), polyester (PES) and/or polyamide (PA). However, additives are introduced to provide the filler material with a hydrophobic coating and to improve the dispersability of said mineral filler material in the polymer composition as well as possibly to improve the processability of this polymer composition and/or properties of the final application products such as fibers, filaments, films, threads and/or breathable films. An elimination of such additives would unacceptably reduce the resulting fiber, filament, film, thread and/or breathable film quality. Furthermore, it is to be noted that such mineral filler materials are generally associated with the presence of volatiles evolving at temperatures reached during the application of such mineral fillers and/or in the processing of said polymer products comprising such mineral fillers. Such volatiles may, for example, be:

inherently associated with the mineral filler ("inherent volatiles"), and is especially associated water, and/or introduced during the treatment of the mineral filler ("added volatiles"), for example, to render the mineral filler more dispersible within a polymeric plastic medium, and/or generated by the reaction of inherent organic materials and/or added organic materials, with the mineral filler; such reactions may especially be induced or enhanced by temperatures reached during the introduction and/or processing of the polymeric material comprising the mineral filler, such as during extrusion or compounding processes; and/or generated by the degradation of inherent organic materials and/or added organic materials, forming $CO_2$, water and possibly low molecular mass fractions of these organic materials; such a degradation may especially be induced or enhanced by temperatures reached during the introduction and/or processing of the polymeric material comprising the mineral filler, such as during extrusion or compounding processes.

As a result of the presence of such volatiles, it may be difficult to prepare a fiber, filament, film, thread and/or breathable film free of voids leading to uneven surfaces and thus to a degradation of the quality of the final polymer product comprising such filler material. Moreover, volatiles may lead to a reduction in the tensile and tear strength of such a fiber, filament, films, thread and/or breathable films, and may degrade its visible aspects, in particular of its visible uniformity. Furthermore, volatiles can generate excessive foaming of the mineral filled polymer melt during a step of compounding, causing unwanted product build-up at the vacuum extraction and hence, forcing a reduced output rate.

Such treated calcium carbonate-containing filler materials are described in a number of documents. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 relates a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114, relating to non-sagging underseal compositions for motor vehicles based on polyvinyl chloride which has improved rheological and adhesion properties, Example 7 discloses a mixture of an ammonium salt of 12-hydroxystearic acid in combination with a fatty acid (in a weight ratio of 1:1) used to treat a mineral filler.

WO 03/082966 relates to a cross-linkable and/or cross-linked nanofiller composition which, in optional embodiments, may additionally include fillers that may or may not be coated with stearic acid, stearate, silane, siloxane and/or titanate. Such nanofiller compositions are used to increase barrier properties, strength and heat distortion temperatures, making them useful in medical, automotive, electrical, construction and food application.

US 2002/0102404 describes dispersible calcium carbonate particles coated on their surface with a combination of saturated and unsaturated aliphatic carboxylic acids and salts thereof along with an organic compound such as a phthalic ester, which are used in adhesive compositions to improve viscosity stability and adhesion properties.

Moreover, US 2002/0102404 describes calcium carbonate particles that are coated on the surface with (1) a fatty acid mixture comprising (1A) at least one of saturated fatty acids and salts thereof and (1B) at least one of unsaturated fatty acids and salts thereof, the (1A):(1B) weight ratio being in the range of 30:70 to 70:30, and (2) an organic compound such as a phthalic ester.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated fatty acid, may be added to a pre-heated slurry of precipitated calcium carbonate, to ultimately produce a desired level of fatty acid coating on the calcium carbonate before proceeding with further process steps.

The abstract of JP54162746 discloses a composition comprising given relative amounts of rigid vinyl chloride resin, fatty acid treated-colloidal calcium carbonate, and barium stearate used in order to improve the heat stability of the vinyl chloride composition.

U.S. Pat. No. 4,520,073 describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula $CH_3(CH_2)_mCOOR$.

WO 2008/077156 A2 relates to spunlaid fibers comprising at least one polymeric resin and at least one filler having an average particle size of less than or equal to about 5 microns and/or having a top cut of less than about 15 microns, wherein the at least one filler is present in an amount of less than about 40% by weight, relative to the total weight of the spunlaid fibers. The coating of the filler is described as being at least one organic material chosen from fatty acids and salts and esters thereof, e.g. stearic acid, stearate, ammonium stearate and calcium stearate.

The applicant also knows about the WO 2011/147778 describing a calcium carbonate-containing mineral filler product for film applications providing a volatile onset temperature of at least 250° C. comprising a treatment layer located on the surface of said mineral filler essentially consisting of saturated aliphatic carboxylic acids having from 6 to 9 carbon atoms and salts thereof.

The applicant also knows about the WO 2011/147802 describing a process to produce a surface treated mineral filler product for film application at a volatile onset temperature of at least 220° C., using one or more aliphatic aldehyde(s) having between 6 and 14 carbon atoms at a treatment level of a theoretical total weight of aldehyde of between 0.25 mg/m$^2$ and 5 mg/m$^2$ on the surface of the treated mineral filler product.

The applicant also knows about the WO 2008/125955 describing a process for the preparation of a treated mineral filler product by treating a dry mineral filler with at least one Group II or Group III salt of a C8 to C24 aliphatic monocarboxylic acid to produce an intermediate mineral filler product followed by treating the intermediate mineral filler product in a second step with at least one C8 to C24 aliphatic monocarboxylic acid to produce a treated mineral filler product and the volatiles, heating the product from 25° C. to 300° C. are below 0.25% by mass.

The applicant also knows about the WO 2010/023144 describing a surface treated mineral filler product comprising a treatment layer of at least one saturated C8 to C24 aliphatic carboxylic acid and at least one di and/or trivalent cation salt of one or more saturated C8 to C24 aliphatic carboxylic acid located on the surface of said mineral filler(s) in a weight ratio of all of said aliphatic carboxylic acid salt(s): all of said aliphatic carboxylic acid(s) from 51:49 to 75:25 and said treatment layer is present in an amount of at least 2.5 mg/m$^2$ and the total volatiles between 25° C. and 280° C. are of less than 0.25% by weight.

The applicant also knows about the publication of Supaphol et al (Colloids and surfaces A 275 (2006) 114-125) mentioning phosphates as possible surface modifier for calcit.

GB 2 336 366 A relates to filled thermoplastic compositions, and, in particular, filled low density polyethylene compositions which are to be formed into products or articles by the process of extrusion. It is further described that the hydrophobising agent is preferably an organic carboxylic acid or partially or fully neutralised salt thereof which has at least one saturated or unsaturated hydrocarbon chain having from 8 to 28 carbon atoms, if the particulate mineral filler has a neutral to alkaline surface reaction, for example calcium carbonate.

WO 2005/011851 A2 relates to a particulate inorganic solid that has been treated with one or more organophosphinic acid. The particulate inorganic solid is preferably titanium dioxide.

The master thesis of LEE CHING SHYA (UNIVERSITY PUTRA MALAYSIA; January 2008) describes different synthesis routes for the preparation of phosphoric acid esters. The thesis further describes the treatment of calcium carbonate with these fatty alcohol-based phosphate esters and the use of the treated calcium carbonate as filler in PVC. Furthermore, several methods for producing phosphoric acid esters are discussed but the importance of the molar ratio of phosphoric acid mono-ester to phosphoric acid di-ester for improving the quality of polymer products is not given in this thesis.

However, the prior art does rarely disclose mineral filler materials that are suitable for polymer compositions and which would solve the following multifaceted technical problem:

the mineral filler material is sufficiently hydrophobic for polymer compositions and the corresponding fiber, filament, film, thread and breathable film products prepared from such polymer composition and which require a good dispersability of the mineral filler material in the polymer composition;

the mineral filler material has a low moisture pick up susceptibility such that the moisture adsorption is e.g. of ≤0.8 mg/g;

the mineral filler material features an increased volatile onset temperature;

the mineral filler material features a limited total quantity of volatiles evolved between 25° C. and 350° C.;

to identify a surface treatment agent featuring a higher flash point than an aliphatic carboxylic acid comprising the same alkyl substituent such that the safety requirements during surface treatment under heat exposure can be reduced and/or the safety risks at equal treatment temperature are reduced;

to identify a surface treatment agent that achieves the above regardless of whether or not the at least one mineral filler material undergoes at least partially a salt exchange on contact with the surface treatment agent to create corresponding calcium salts on the surface of the mineral filler material;

the fibers, filaments, films, threads and breathable films comprising such mineral filler material show good mechanical properties such as tensile modulus, tensile test at yield and at break, elongation at break and tear resistance.

Thus, there is still a need for polymer compositions comprising treated mineral filler materials and in particular white mineral filler materials which address the foregoing technical problems and especially allows for improving the mechanical properties of final application products such as fibers, filaments, films, threads and breathable films prepared from such a polymer composition.

Accordingly, it is an objective of the present invention to provide a polymer composition comprising a mineral filler material and imparting improved mechanical properties to final application products such as fibers, filaments, films, threads and/or breathable films. A further objective is to provide a polymer composition comprising a treated mineral filler material having improved surface characteristics, and especially a low hydrophilicity for such plastic applications. A further objective is to provide a polymer composition comprising a treated mineral filler material featuring low moisture pick up susceptibility. Even a further objective is to provide a polymer composition comprising a treated mineral filler material having a high volatile onset temperature. A still further objective is to provide a polymer composition comprising a treated mineral filler material featuring a limited quantity of total volatiles evolved at temperatures of between 25 and 350° C. Another objective of the present invention is to provide a treated mineral filler material prepared by using a surface treatment agent which can be easily handled and features a high flash point. A further objective is to provide a treated mineral filler material prepared by a process that can be carried out under cost-efficient and mild conditions, i.e. by avoiding an intensive thermal treatment. Further objectives can be gathered from the following description of the invention.

The foregoing and other objectives are solved by the subject-matter as defined herein in claim 1.

Advantageous embodiments of the inventive fibers and/or filaments and/or films comprising a treated mineral filler material are defined in the corresponding sub-claims.

According to one aspect of the present application a polymer composition is provided, comprising
a) at least one polymeric resin, and
b) from 0.1 to 95 wt.-% wt.-%, based on the total weight of the polymer composition, of at least one surface reactive white mineral material, wherein the at least one surface reactive white mineral material
  i) comprises surface reactive white mineral material-containing particles having a weight median particle size $d_{50}$ of ≤7.5 μm, and having a solubility in water at 20° C. (±2° C.) of below 0.1 wt.-%, based on the total dry weight of the surface reactive white mineral material-containing particles
  ii) has a moisture pick up susceptibility of ≤0.8 mg/g,
  iii) has a volatile onset temperature of ≥250° C., and
  iv) has a hydrophilicity of below 8:2 volumetric ratio of water:ethanol measured at +23° C. (±2° C.) with the sedimentation method,
wherein the at least one surface reactive white mineral material comprising on at least a part of the surface of the surface reactive white mineral material-containing particles a phosphoric acid ester blend of one or more phosphoric acid mono-ester and salty reaction products thereof and one or more phosphoric acid di-ester and salty reaction products thereof, wherein the molar ratio of the one or more phosphoric acid mono-ester and salty reaction products thereof to the one or more phosphoric acid di-ester and salty reaction products thereof in the phosphoric acid ester blend is from 1:1 to 1:100 and wherein the at least one surface reactive white mineral material comprises the phosphoric acid ester blend in an amount of at least 0.1 wt.-%, based on the total dry weight of the at least one surface reactive white mineral material.

The inventors surprisingly found out that the foregoing polymer composition imparts excellent mechanical properties to final application products such as fibers and/or filaments and/or films and/or threads and/or breathable films. In particular, it has been found out that the surface reactive white mineral material according to the present invention being part of the polymer composition provides a sufficient hydrophilicity and very low moisture pick up susceptibility as well as a high volatile onset temperature of at least 250° C., a limited quantity of total volatiles evolved at temperatures of between 25 and 350° C. and a high flash point.

It should be understood that for the purposes of the present invention, the following terms have the following meanings:

For the purpose of the present invention, the term "surface reactive white mineral material" refers to surface reactive white mineral material-containing particles comprising on at least a part of the particle surface a phosphoric acid ester blend of one or more phosphoric acid mono-ester and salty reaction products thereof and one or more phosphoric acid di-ester and salty reaction products thereof.

The term surface reactive white "mineral material" in the meaning of the present application refers to mineral material-containing particles being water insoluble. The term "water insoluble" refers to a solubility of the mineral material-containing particles in water at 20° C. (±2° C.) of <0.1 wt.-%, based on the total dry weight of the surface reactive white mineral material-containing particles.

The term "surface reactive" white mineral material or "surface reactive" white mineral material-containing particles in the meaning of the present application refers to mineral material-containing particles having a mineral surface being capable of reacting with acids being proton donators as defined by Brönsted (Grundwissen Chemie, Allgemeine and anorganische Chemie, page 96, Arnold Arni, Ernst Klett Verlag, Stuttgart) and comprising divalent and/or trivalent cations, such as strontium, calcium, magnesium and/or aluminum cations, and anions, such as carbonates, borates and/or hydroxides, being replaceable by anionic groups, such as the anionic groups of phosphoric acid and/or phosphoric acid mono-ester and/or phosphoric acid di-ester. That is to say, the divalent and/or trivalent cations, such as strontium, calcium, magnesium and/or aluminum cations, being present on the mineral surface of the mineral material-containing particles are capable of forming the corresponding salts with the anionic groups of phosphoric acid and/or phosphoric acid mono-ester and/or phosphoric acid di-ester.

For the purpose of the present invention, the term surface reactive "white" minerals refers to a brightness R457 of at least 70% as measured according to ISO 2469. Preferably, a brightness R457 of at least 80%, more preferably of at least 90% as measured according to ISO 2469. It is to be noted that the brightness R457 refers to the average brightness R457 measured for the sum of particles which are measured.

The term "polymer resin" in the meaning of the present invention refers to a polymeric material, either solid or liquid, prior to processing it into a polymeric fiber and/or filament and/or film.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "salty reaction products" in the meaning of the present invention refers to products obtained by contacting surface reactive white mineral material-containing particles with one or more phosphoric acid mono-ester and one or more phosphoric acid di-ester and optionally phosphoric acid. Said salty reaction products are formed between the applied one or more phosphoric acid mono-ester and one or more phosphoric acid di-ester and optionally phosphoric acid and reactive molecules located at the surface of the surface reactive white mineral material-containing particles.

The term "volatile onset temperature" in the meaning of the present application refers to a temperature at which volatiles—including volatiles introduced as a result of common mineral filler preparation steps including grinding, with or without grinding aid agents, benefaction, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

The term "specific surface area" (in $m^2/g$) of the mineral filler in the meaning of the present invention is determined using the BET method, which is well known to the skilled man (ISO 9277:1995). The total surface area (in $m^2$) of the mineral filler is then obtained by multiplication of the specific surface area and the mass (in g) of the mineral filler prior to treatment.

The term "moisture pick up susceptibility" in the meaning of the present invention refers to the amount of moisture absorbed on the surface of the mineral filler and is determined in mg moisture/g of the dry treated mineral filler product a temperature of +23° C. (±2° C).

The "hydrophilicity" of a mineral filler product is evaluated at +23° C. (±2° C.) by determining the minimum water to ethanol ratio in a volume/volume based water/ethanol-mixture needed for the settling of the majority of said mineral filler product, where said mineral filler product is deposited on the surface of said water ethanol-mixture by passage through a house hold tea sieve. The volume/volume base is related to the volumes of both separate liquids before blending them together and do not include the volume contraction of the blend.

As used herein and as generally defined in the art, the "$d_{50}$" value is determined based on measurements made by using a Sedigraph™ 5100 of Micromeritics Instrument Corporation (operating instrument software version 1.04) and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to another aspect of the present invention, a process for preparing a surface reactive white mineral material is provided, the process comprising the steps of:

(a) providing surface reactive white mineral material-containing particles having a weight median particle size $d_{50}$ of ≤7.5 µm, and having a solubility in water at 20° C. (±2° C.) of below 0.1 wt.-%, based on the total dry weight of the surface reactive white mineral material-containing particles;

(b) providing a phosphoric acid ester blend comprising one or more phosphoric acid mono-ester and one or more phosphoric acid di-ester, and optionally one or more phosphoric acid tri-ester and/or phosphoric acid, wherein the molar ratio of the one or more phosphoric acid mono-ester to the one or more phosphoric acid di-ester in the phosphoric acid ester blend is from 1:1 to 1:100;

(c) contacting said surface reactive white mineral material-containing particles of step (a), in one or more steps, with the phosphoric acid ester blend of step (b) such that a phosphoric acid ester blend comprising one or more phosphoric acid mono-ester and salty reaction products thereof and one or more phosphoric acid di-ester and salty reaction products thereof and optionally one or more phosphoric acid tri-ester and/or phosphoric acid and salty reaction products thereof is formed on at least a part of the surface of said surface reactive white mineral material-containing particles of step (a);

wherein, before and/or during step (c), the temperature is adjusted such that the phosphoric acid ester blend of step (b) is liquid.

It is preferred that the contacting of the surface reactive white mineral material-containing particles with the phosphoric acid ester blend according to step (c) is carried out at a temperature of from 20 to 200° C., preferably of from 90 to 200° C., more preferably of from 100 to 150° C. and most preferably of from 110 to 130° C. It is further preferred that i) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent, and/or ii) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20 and most preferably from C8 to C18 in the alcohol substituent and/or iii) the one or more phosphoric acid tri-ester consists of an o-phosphoric acid molecule tri-esterified with three alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20 and most preferably from C8 to C18 in the alcohol substituent.

According to a further aspect of the present invention, a surface reactive white mineral material obtainable by the process is provided.

According to an even further aspect of the present invention, a method for preparing a fibre and/or filament and/or film and/or thread and/or breathable film comprising at least the steps of:
 a) providing the polymer composition, and
 b) subjecting the polymer composition of step a) to conditions under which said polymer composition is converted into a fibre and/or filament and/or film and/or thread and/or breathable film.

According to a still further aspect of the present invention, a fibre and/or filament and/or film and/or thread and/or breathable film comprising the polymer composition and/or the surface reactive white mineral material is provided. According to another aspect of the present invention, an article comprising the polymer composition and/or the surface reactive white mineral material and/or the fibre and/or filament and/or film and/or thread and/or breathable film is provided, wherein the article is selected from the group comprising hygiene products, medical and healthcare products, filter products, geotextile products, agriculture and horticulture products, clothing, footwear and baggage products, household and industrial products, packaging products, construction products and the like. According to an even further aspect of the present invention, the use of a phosphoric acid ester blend for decreasing the hydrophilicity and/or moisture pick up susceptibility of the surface reactive white mineral material-containing particle surface is provided.

According to one embodiment of the present invention, the surface reactive white mineral material-containing particles of the at least one surface reactive white mineral material are mineral particles having a brightness R457 of at least 70% as measured according to ISO 2469, preferably the surface reactive white mineral material-containing particles of the at least one surface reactive white mineral material are calcium carbonate-containing particles, more preferably the calcium carbonate-containing particles of the at least one surface reactive white mineral material are selected from among ground calcium carbonate (GCC), precipitated calcium carbonate (PCC) and mixtures thereof.

According to another embodiment of the present invention, the at least one surface reactive white mineral material comprises i) surface reactive white mineral material-containing particles in an amount of ≥90 wt.-%, preferably of ≥95 wt.-% and most preferably of ≥97.5 wt.-%, based on the total dry weight of the at least one surface reactive white mineral material, and/or ii) the phosphoric acid ester blend in an amount of from 0.1 to 5 wt.-%, preferably of from 0.2 to 3 wt.-% and most preferably of from 0.3 to 2 wt.-%, based on the total dry weight of the at least one surface reactive white mineral material.

According to yet another embodiment of the present invention, the molar ratio of the one or more phosphoric acid mono-ester and salty reaction products thereof to the one or more phosphoric acid di-ester and salty reaction products thereof in the phosphoric acid ester blend is from 1:1.1 to 1:80, preferably from 1:1.1 to 1:60, more preferably from 1:1.1 to 1:40, even more preferably from 1:1.1 to 1:20 and most preferably from 1:1.1 to 1:10.

According to one embodiment of the present invention, the phosphoric acid ester blend further comprises one or more phosphoric acid tri-ester and/or phosphoric acid and salty reaction products thereof.

According to another embodiment of the present invention, i) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent, and/or ii) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20 and most preferably from C8 to C18 in the alcohol substituent, and/or iii) the one or more phosphoric acid tri-ester consists of an o-phosphoric acid molecule tri-esterified with three alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20 and most preferably from C8 to C18 in the alcohol substituent.

According to yet another embodiment of the present invention, the phosphoric acid ester blend comprises salty reaction products such as one or more strontium, calcium, magnesium and/or aluminum salts of phosphoric acid mono-esters and one or more strontium, calcium, magnesium and/or aluminum salts of phosphoric acid di-ester and optionally one or more strontium, calcium, magnesium and/or aluminum salts of phosphoric acid.

According to one embodiment of the present invention, the at least one polymeric resin is at least one thermoplastic polymer, preferably a thermoplastic polymer selected from the group comprising homopolymers and/or copolymers of polyolefins, polyamides, halogen-containing polymers and/or polyesters.

As set out above, the inventive polymer composition comprises at least one polymeric resin and from 0.1 to 95 wt.-% of at least one surface reactive white mineral material as set out in points (a) and (b). In the following, it is referred to further details of the present invention and especially the foregoing points of the inventive polymer composition.

According to point (a) of the present invention, the polymer composition comprises at least one polymeric resin. The polymer resin represents the backbone of the composition and provides strength, flexibility, toughness and durability to the final fiber and/or filament and/or film and/or thread and/or breathable film.

It is appreciated that the at least one polymeric resin according to the present invention is not restricted to a specific resin material as long as the polymer composition is suitable for the preparation of fibers and/or filaments and/or films and/or threads and/or breathable films.

In one embodiment of the present invention, the at least one polymeric resin is at least one thermoplastic polymer. Thus, it is preferred that the at least one polymeric resin is a thermoplastic polymer selected from the group comprising homopolymers and/or copolymers of polyolefins, polyamides, halogen-containing polymers and/or polyesters.

For example, if the at least one polymeric resin is a polyamide the at least one polymeric resin is preferably nylon.

Additionally or alternatively, the at least one polymeric resin is a homopolymer and/or copolymer of a polyolefin. For example, the at least one polymeric resin is a homopolymer and a copolymer of a polyolefin. Alternatively, the at least one polymeric resin is a homopolymer or a copolymer of a polyolefin.

It is appreciated that the at least one polymeric resin is preferably a homopolymer of a polyolefin.

For example, the polyolefin can be polyethylene and/or polypropylene and/or polybutylene. Accordingly, if the polyolefin is polyethylene, the polyolefin is selected from the group comprising homopolymers and/or copolymers of polyethylene like high-density polyethylene (HDPE), medium-density polyethylene (MDPE), low-density polyethylene (LDPE), very low-density polyethylene (VLDPE), linear low-density polyethylene (LLDPE).

For example, the polyolefin is a homopolymer and/or copolymer of polyethylene.

The expression homopolymer of polyethylene used in the present invention relates to polyethylene comprising a polyethylene that consists substantially, i.e. of more than 99.7 wt.-%, still more preferably of at least 99.8 wt.-%, based on the total weight of the polyethylene, of ethylene units. For example, only ethylene units in the homopolymer of polyethylene are detectable.

In case the at least one polymeric resin of the polymer composition comprises a copolymer of polyethylene, it is appreciated that the polyethylene contains units derivable from ethylene as major components. Accordingly, the copolymer of polyethylene comprises at least 55 wt.-% units derivable from ethylene, more preferably at least 60 wt.-% of units derived from ethylene, based on the total weight of the polyethylene. For example, the copolymer of polyethylene comprises 60 to 99.5 wt.-%, more preferably 90 to 99 wt.-%, units derivable from ethylene, based on the total weight of the polyethylene. The comonomers present in such copolymer of polyethylene are $C_3$ to $C_{10}$ $\alpha$-olefins, preferably 1-butene, 1-hexene and 1-octene, the latter especially preferred.

Additionally or alternatively, the polyolefin is a homopolymer and/or copolymer of polypropylene.

The expression homopolymer of polypropylene as used throughout the instant invention relates to a polypropylene that consists substantially, i.e. of more than 99 wt.-%, still more preferably of at least 99.5 wt.-%, like of at least 99.8 wt.-%, based on the total weight of the polypropylene, of propylene units. In a preferred embodiment only propylene units are detectable in the homopolymer of polypropylene.

In case the at least one polymeric resin of the polymer composition comprises a copolymer of polypropylene, the polypropylene preferably contains units derivable from propylene as major components. The copolymer of polypropylene preferably comprises, preferably consists of, units derived from propylene and $C_2$ and/or at least one $C_4$ to $C_{10}$ $\alpha$-olefin. In one embodiment of the present invention, the copolymer of polypropylene comprises, preferably consists of, units derived from propylene and at least one $\alpha$-olefin selected from the group consisting of ethylene, 1-butene, 1-pentene, 1-hexene and 1-octene. For example, the copolymer of polypropylene comprises, preferably consists of, units derived from propylene and ethylene. In one embodiment of the present invention, the units derivable from propylene constitutes the main part of the polypropylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polypropylene. The amount of units derived from $C_2$ and/or at least one $C_4$ to $C_{10}$ $\alpha$-olefin in the copolymer of polypropylene, is in the range of 1 to 40 wt.-%, more preferably in the range of 1 to 30 wt.-% and most preferably in the range of 1 to 20 wt.-%, based on the total weight of the copolymer of polypropylene.

If the copolymer of polypropylene comprises only units derivable from propylene and ethylene, the amount of ethylene is preferably in the range of 1 to 20 wt.-%, preferably in the range of 1 to 15 wt.-% and most preferably in the range of 1 to 10 wt.-%, based on the total weight of the copolymer of polypropylene. Accordingly, the amount of propylene is preferably in the range of 80 to 99 wt.-%, preferably in the range of 85 to 99 wt.-% and most preferably in the range of 90 to 99 wt.-%, based on the total weight of the copolymer of polypropylene.

Additionally or alternatively, the polyolefin is a homopolymer and/or copolymer of polybutylene.

The expression homopolymer of polybutylene as used throughout the instant invention relates to a polybutylene that consists substantially, i.e. of more than 99 wt.-%, still more preferably of at least 99.5 wt.-%, like of at least 99.8 wt.-%, based on the total weight of the polybutylene, of butylene units. In a preferred embodiment only butylene units are detectable in the homopolymer of polybutylene.

In case the at least one polymeric resin of the polymer composition comprises a copolymer of polybutylene, the polybutylene preferably contains units derivable from butylene as major components. The copolymer of polybutylene preferably comprises, preferably consists of, units derived from butylene and $C_2$ and/or $C_3$ and/or at least one $C_5$ to $C_{10}$ $\alpha$-olefin. In one embodiment of the present invention, the copolymer of polybutylene comprises, preferably consists of, units derived from butylene and at least one $\alpha$-olefin selected from the group consisting of ethylene, 1-propene, 1-pentene, 1-hexene and 1-octene. For example, the copolymer of polybutylene comprises, preferably consists of, units derived from butylene and ethylene. In one embodiment of the present invention, the units derivable from butylene constitutes the main part of the polybutylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polybutylene. The amount of units derived from $C_2$ and/or $C_3$ and/or at least one $C_5$ to $C_{10}$ $\alpha$-olefin in the copolymer of polybutylene, is in the range of 1 to 40 wt.-%, more preferably in the range of 1 to 30 wt.-% and most preferably in the range of 1 to 20 wt.-%, based on the total weight of the copolymer of polybutylene.

If the at least one polymeric resin is a homopolymer and/or copolymer of a halogen-containing polymer, the at least one polymeric resin is preferably selected from polyvinylchloride (PVC), polyvinylidene chloride (PVDC), polyvinylidene fluoride (PVDF) and polytetrafluoroethylene (PTFE).

If the at least one polymeric resin is a homopolymer and/or copolymer of polyester, the at least one polymeric resin is preferably selected from polyethylene terephthalate (PET), polytrimethylene terephthalate (PTT), polybutylene terephtalate (PBT), polyethylene aphthalate (PEN), but also degradable polyesters, such as polylactic acid (polylactide, PLA).

In one embodiment of the present invention, the at least one polymeric resin is a homopolymer of polyethylene and/or polypropylene and/or polybutylene. For example, the at least one polymeric resin is a homopolymer of polyethylene and polypropylene. Alternatively, the at least one polymeric resin is a homopolymer of polyethylene or polypropylene. In one embodiment of the present invention, the at least one polymeric resin is a homopolymer of polypropylene.

The expression "at least one" polymeric resin means that one or more kinds of polymeric resin may be present in the inventive polymer composition.

Accordingly, it is appreciated that the at least one polymeric resin may be a mixture of two or more kinds of polymeric resins. For example, if the at least one polymeric resin is a mixture of two or more polymeric resins, one polymeric resin is a homopolymer or copolymer of polypropylene, while the second or further polymeric resin is selected from the group comprising homopolymers and/or copolymers of polyethylene, polybutylene, polyamides, polyesters, halogen-containing polymers and mixtures thereof.

In one embodiment of the present invention, the at least one polymeric resin is one kind of polymeric resin. Preferably, the at least one polymeric resin is a homopolymer of polyethylene or polypropylene.

In one embodiment of the present invention, the at least one polymeric resin has a melting temperature Tm of above 100° C., more preferably of above 150° C., like of above 200° C. For example, the melting temperature of the at least one polymeric resin ranges from 100 to 350° C., more preferably ranges from 150 to 325° C. and most preferably ranges from 200 to 300° C.

Furthermore, it is appreciated that the at least one polymeric resin may be selected from polymeric resins having a broad spectrum of melt flow rate. In general, it is preferred that the at least one polymeric resin has a melt flow rate MFR (190° C.) of from 0.1 to 3 000 g/10 min, more preferably of from 0.2 to 2 500 g/10 min. For example, the at least one polymeric resin has a melt flow rate MFR (190° C.) of from 0.3 to 2 000 g/10 min or from 0.3 to 1 600 g/10 min. Additionally or alternatively, the at least one polymeric resin has a melt flow rate MFR (230° C.) of from 0.1 to 3 000 g/10 min, more preferably of from 0.2 to 2 500 g/10 min. For example, the at least one polymeric resin has a melt flow rate MFR (230° C.) of from 0.3 to 2 000 g/10 min or from 0.3 to 1 600 g/10 min.

For example, if the at least one polymeric resin is a polyolefin being a homopolymer and/or copolymer of polypropylene, it is preferred that the at least one polymeric resin has a melt flow rate MFR (190° C., 2.16 kg) of from 1 to 3 000 g/10 min, more preferably of from 3 to 2 500 g/10 min. For example, the at least one polymeric resin which is a homopolymer and/or copolymer of polypropylene has a melt flow rate MFR (190° C.) of from 5 to 2 000 g/10 min or from 10 to 1 600 g/10 min. It is preferred that the at least one polymeric resin which is a homopolymer and/or copolymer of polypropylene has a melt flow rate MFR (230° C.) of from 1 to 3 000 g/10 min, more preferably of from 3 to 2 500 g/10 min. For example, the at least one polymeric resin which is a homopolymer and/or copolymer of polypropylene has a melt flow rate MFR (230° C.) of from 5 to 2 000 g/10 min or from 10 to 1 600 g/10 min.

If the at least one polymeric resin is a polyolefin being a homopolymer and/or copolymer of polyethylene, it is appreciated that the at least one polymeric resin has a rather low melt flow rate. Accordingly, it is preferred that the at least one polymeric resin which is a homopolymer and/or copolymer of polyethylene has a melt flow rate MFR (190° C.) of from 0.5 to 20 g/10 min, more preferably of from 0.7 to 15 g/10 min. For example, the at least one polymeric resin has a melt flow rate MFR (190° C.) of from 0.9 to 10 g/10 min or from 0.9 to 5 g/10 min. Additionally or alternatively, the at least one polymeric resin which is a homopolymer and/or copolymer of polyethylene has a melt flow rate MFR (230° C.) of from 0.1 to 3 000 g/10 min, more preferably of from 0.2 to 2 500 g/10 min. For example, the at least one polymeric resin which is a homopolymer and/or copolymer of polyethylene has a melt flow rate MFR (230° C.) of from 0.3 to 2 000 g/10 min or from 0.3 to 1 600 g/10 min.

It is appreciated that the polymer composition comprises the at least one polymeric resin in an amount of from 5 to 99.9 wt.-%, based on the total weight of the polymer composition. In one embodiment of the present invention, the polymer composition comprises the at least one polymeric resin in an amount of from 5 to 95 wt.-%, preferably from 15 to 90 wt.-%, based on the total weight of the polymer composition. For example, the polymer composition comprises the at least one polymeric resin in an amount of from 20 to 85 wt.-%, based on the total weight of the polymer composition.

A further essential component of the present polymer composition is at least one surface reactive white mineral material. It is one requirement of the present invention that the polymer composition comprises the at least one surface reactive white mineral material in an amount of 0.1 to 95 wt.-%, based on the total weight of the polymer composition.

In one embodiment of the present invention, the polymer composition comprises the at least one surface reactive white mineral material in an amount of from 5 to 95 wt.-% and preferably from 10 to 85 wt.-%, based on the total weight of the polymer composition. For example, the polymer composition comprises the at least one surface reactive white mineral material in an amount of from 15 to 80 wt.-%, based on the total weight of the polymer composition.

It is thus appreciated that the polymer composition comprises, preferably consists of, the at least one polymeric resin in an amount of from 5 to 99.9 wt.-% and the at least one surface reactive white mineral material from 0.1 to 95 wt.-%, based on the total weight of the polymer composition. In one embodiment of the present invention, the polymer composition comprises, preferably consists of, the at least one polymeric resin in an amount of from 5 to 95 wt.-% and the at least one surface reactive white mineral material from 5 to 95 wt.-%, based on the total weight of the polymer composition. In another embodiment of the present invention, the polymer composition comprises, preferably consists of, the at least one polymeric resin in an amount of from 15 to 90 wt.-% and the at least one surface reactive white mineral material from 10 to 85 wt.-%, based on the total weight of the polymer composition. In another embodiment of the present invention, the polymer composition comprises, preferably consists of, the at least one polymeric resin in an amount of from 20 to 85 wt.-% and the at least one surface reactive white mineral material from 15 to 80 wt.-%, based on the total weight of the polymer composition.

For example, the polymer composition comprises, preferably consists of, the at least one polymeric resin and calcium carbonate containing mineral material and the calcium carbonate containing mineral material is present in an amount of from 15 to 82 wt.-%, based on the total weight of the polymer composition.

In one embodiment of the present invention, the polymer composition is a masterbatch.

The term "masterbatch" refers to a composition having a concentration of the at least one surface reactive white mineral material that is higher than the concentration of the polymer composition used for preparing the final application product such as a fiber and/or filament and/or film and/or thread and/or breathable film. That is to say, the masterbatch is further diluted such as to obtain a polymer composition which is suitable for preparing the final application product such as a fiber and/or filament and/or film and/or thread and/or breathable film.

For example, the masterbatch comprises the at least one surface reactive white mineral material in an amount of from 50 to 95 wt.-%, preferably from 60 to 95 wt.-% and more preferably from 70 to 95 wt.-%, based on the total weight of the masterbatch. For example, the masterbatch comprises the at least one surface reactive white mineral material in an amount of from 80 to 95 wt.-%, based on the total weight of the masterbatch.

According to one embodiment of the present invention, the masterbatch is used to produce fibers and/or filaments and/or films and/or threads and/or breathable films.

In another embodiment of the present invention, the polymer composition used for preparing the final application product such as a fiber and/or filament and/or film and/or thread and/or breathable films comprises the at least one surface reactive white mineral material in an amount of from 1 to 50 wt.-%, preferably of from 5 to 45 wt.-% and most preferably from 10 to 40 wt.-%, based on the total weight of the polymer composition. For example, the polymer composition used for preparing the final application product such as a fiber and/or filament and/or film and/or thread and/or breathable film comprises the at least one surface reactive white mineral material in an amount of from 15 to 25 wt.-%, based on the total weight of the polymer composition.

In another embodiment of the present invention, the polymer composition used for preparing the final application product such as a fiber and/or filament and/or film and/or thread and/or breathable film comprises the at least one surface reactive white mineral material in an amount of from 1 and 10 wt.-%, based on the total weight of the polymer composition. It is appreciated that the polymer composition preferably comprises this amount when it is used as packaging material for acidic food like citrus fruits or containers and/or bottles for fruit juice.

If a masterbatch is used to produce fibers and/or filaments and/or films and/or threads and/or breathable films, it is preferred that the masterbatch is diluted such as to obtain a polymer composition suitable for preparing the final application product such as a fiber and/or filament and/or film and/or thread and/or breathable films. That is to say, the masterbatch is diluted such as to comprises the at least one surface reactive white mineral material in an amount of 1 to 50 wt.-%, preferably of from 5 to 45 wt.-% and most preferably from 10 to 40 wt.-%, based on the total weight of the polymer composition.

According to another embodiment of the present invention, the polymer composition is a fibre and/or filament and/or film and/or thread and/or breathable film. For example, the fiber and/or filament and/or film and/or thread and/or breathable film comprises the at least one surface reactive white mineral material in an amount of from 1 to 50 wt.-%, preferably from 5 to 45 wt.-%, more preferably from 10 to 40 wt.-% and most preferably from 15 to 25 wt.-%, based on the total weight of the fiber and/or filament and/or film and/or thread and/or breathable film.

According to the present invention, the at least one surface reactive white mineral material comprises, preferably consists of, surface reactive white mineral material-containing particles which comprise on at least a part of the surface of said particles a phosphoric acid ester blend of one or more phosphoric acid mono-ester and salty reaction products thereof and one or more phosphoric acid di-ester and salty reaction products thereof and optionally one or more phosphoric acid tri-ester and/or phosphoric acid and salty reaction products thereof.

Accordingly, the at least one surface reactive white mineral material comprises surface reactive white mineral material-containing particles.

It is appreciated that the surface reactive white mineral material-containing particles of the at least one surface reactive white mineral material are mineral particles being selected such that said particles have a brightness R457 of at least 70% as measured according to ISO 2469. In one embodiment of the present invention, the surface reactive white mineral material-containing particles of the at least one surface reactive white mineral material are mineral particles having a brightness R457 of at least 80% or of at least 90% as measured according to ISO 2469. For example, the surface reactive white mineral material-containing particles of the at least one surface reactive white mineral material are mineral particles having a brightness R457 of from 70% to 100%, preferably of from 80% to 98% and most preferably of from 90% to 98% as measured according to ISO 2469.

In one embodiment of the present invention, the surface reactive white mineral material-containing particles of the at least one surface reactive white mineral material are mineral particles comprising divalent and/or trivalent cations which are capable of forming the corresponding divalent and/or trivalent salts with the anionic groups of phosphoric acid and/or phosphoric acid mono-ester and/or phosphoric acid di-ester. For example, the surface reactive white mineral material-containing particles of the at least one surface reactive white mineral material are mineral particles comprising strontium, calcium, magnesium and/or aluminum cations. Preferably, the surface reactive white mineral material-containing particles of the at least one surface reactive white mineral material are mineral particles comprising calcium and magnesium cations. Alternatively, the surface reactive white mineral material-containing particles of the at least one surface reactive white mineral material are mineral particles comprising calcium, magnesium or aluminum cations. In addition thereto, the surface reactive white mineral material-containing particles of the at least one surface reactive white mineral material are mineral particles comprising anions, such as carbonates, borates and/or hydroxides, which can be replaced by the anionic groups of phosphoric acid and/or phosphoric acid mono-ester and/or phosphoric acid di-ester.

In one embodiment of the present invention, the surface reactive white mineral material-containing particles of the at least one surface reactive white mineral material are calcium carbonate-containing particles. Accordingly, a "calcium carbonate-containing material" is obtained by contacting the calcium carbonate-containing particles with the phosphoric acid ester blend of the present invention.

For the purpose of the present invention, the term "calcium carbonate-containing particles" refers to a material that comprises at least 80 wt.-% calcium carbonate, based on the total dry weight of the calcium carbonate-containing particles.

For the purpose of the present invention, the term "calcium carbonate-containing particles" also refers to a material that comprises at least 50 molar-% calcium carbonate based on total Mols, if the calcium carbonate-containing particles are dolomite.

The calcium carbonate-containing particles in the meaning of the present invention refer to a calcium carbonate material selected among ground calcium carbonate (GCC), precipitated calcium carbonate (PCC) and mixtures thereof.

GCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. In one embodiment of the present invention, the GCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles hydrated in water or by precipitation out of ionic salt solutions. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

In one preferred embodiment, the surface reactive white mineral material-containing particles are calcium carbonate-containing particles which are selected from marble, dolomitic marble and mixtures thereof.

It is appreciated that the amount of calcium carbonate in the calcium carbonate-containing particles is at least 80 wt.-%, e.g. at least 95 wt.-%, preferably between 97 and 100 wt.-%, more preferably between 98.5 and 99.95 wt.-%, based on the total dry weight of the calcium carbonate containing particles.

The surface reactive white mineral material-containing particles are preferably in the form of a particulate material, and may have a particle size distribution as conventionally employed for the material(s) involved in the type of product to be produced. In general, it is one requirement of the present invention that the surface reactive white mineral material-containing particles, preferably calcium carbonate-containing particles, have a weight median particle size $d_{50}$ of ≤7.5 μm. For example, the surface reactive white mineral material-containing particles, of the at least one surface reactive white mineral material, preferably calcium carbonate-containing particles, have a weight median particle size $d_{50}$ from 0.1 μm to 7.5 μm, more preferably from 0.25 μm to 5 μm and most preferably from 0.7 μm to 4 μm. A mineral filler $d_{98}$ of less than 25 microns may also be advantageous.

Additionally or alternatively, the surface reactive white mineral material-containing particles of the at least one surface reactive white mineral material, preferably calcium carbonate-containing particles, have a BET specific surface area of from 0.5 to 150 m$^2$/g, more preferably of from 0.5 to 35 m$^2$/g and most preferably of from 0.5 to 15 m$^2$/g, measured using nitrogen and the BET method according to ISO 9277.

For example, if marble is used as the surface reactive white mineral material-containing particles of the at least one surface reactive white mineral material, the median particle size diameter $d_{50}$ value is preferably from 0.1 μm to 7.5 μm, more preferably from 0.25 μm to 5 μm and most preferably from 0.7 μm to 4 μm. In this case, the marble preferably exhibits a BET specific surface area of from 0.5 to 150 m$^2$/g, more preferably of from 0.5 to 35 m$^2$/g and most preferably of from 0.5 to 15 m$^2$/g, measured using nitrogen and the BET method according to ISO 9277.

It is preferred that the surface reactive white mineral material-containing particles of the at least one surface reactive white mineral material, preferably calcium carbonate-containing particles, are a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the surface reactive white mineral material-containing particles of the at least one surface reactive white mineral material, preferably calcium carbonate-containing particles, comprise wet ground surface reactive white mineral material-containing particles, preferably calcium carbonate-containing particles, the grinding step may be performed under conditions such that autogenous grinding takes place and/or by horizontal ball milling, and/or other such processes known to the skilled man. The wet processed ground surface reactive white mineral material-containing particles of the at least one surface reactive white mineral material, preferably wet ground calcium carbonate-containing particles, thus obtained may be washed and dewatered by well known processes, e.g. by flocculation, filtration or forced evaporation prior to drying.

The subsequent step of drying may be carried out in a single step such as spray drying, or in at least two steps, e.g. by applying a first heating step to the surface reactive white mineral material-containing particles, preferably calcium carbonate-containing particles, in order to reduce the associated moisture content to a level which is not greater than about 0.5 wt.-% based on the dry weight of the surface reactive white mineral material-containing particles, preferably calcium carbonate-containing particles, and applying a second heating step to the calcium carbonate in order to reduce the remaining moisture content to a level which is about 0.15 wt.-% or less, based on the dry weight of the surface reactive white mineral material-containing particles, preferably calcium carbonate-containing particles. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that such surface reactive white mineral material-containing particles, preferably calcium carbonate-containing particles, undergo a beneficiation step (such as a flotation, bleaching or magnetic separation step) to remove impurities.

In one preferred embodiment, the surface reactive white mineral material-containing particles of the at least one surface reactive white mineral material, preferably calcium carbonate-containing particles, comprise dry ground surface reactive white mineral material-containing particles, preferably calcium carbonate-containing particles. In another preferred embodiment, the surface reactive white mineral material-containing particles of the at least one surface reactive white mineral material, preferably calcium carbonate-containing particles, are a material being wet ground in a ball- and/or attritor mill, and subsequently dried by using the well known process of spray drying.

Depending on the surface reactive white mineral material-containing particles of the at least one surface reactive white mineral material, the total surface moisture content of the surface reactive white mineral material-containing particles, preferably calcium carbonate-containing particles, is preferably less than 0.2 wt.-%, more preferably <0.1% based on the dry weight of the surface reactive white mineral material-containing particles.

In one preferred embodiment, the surface reactive white mineral material-containing particles of the at least one surface reactive white mineral material, preferably calcium carbonate-containing particles, have a total surface moisture content of from 0.01 to 0.2 wt.-%, preferably from 0.02 to 0.15 wt.-% and more preferably from 0.04 to 0.07 wt.-%, based on the dry weight of the surface reactive white mineral material-containing particles.

For example, in case a wet ground and spray dried marble is used as the surface reactive white mineral material-containing particles of the at least one surface reactive white mineral material, the total surface moisture content of the calcium carbonate-containing particles is preferably of from 0.01 to 0.1 wt.-%, more preferably from 0.02 to 0.08 wt.-% and most preferably from 0.04 to 0.07 wt.-%, based on the dry weight of the surface reactive white mineral material-containing particles. If a PCC is used as surface reactive white mineral material-containing particles of the at least one surface reactive white mineral material, the total surface moisture content of the surface reactive white mineral material-containing particles is preferably of from 0.01 to 0.2 wt.-%, more preferably from 0.05 to 0.17 wt.-% and most preferably from 0.05 to 0.10 wt.-%, based on the dry weight of the surface reactive white mineral material-containing particles.

It is further required that the surface reactive white mineral material-containing particles of the at least one surface reactive white mineral material have a solubility in water at 20° C. (±2° C.) of below 0.1 wt.-%, based on the total dry weight of the surface reactive white mineral material-containing particles. For example, the surface reactive white mineral material-containing particles of the at least one surface reactive white mineral material have a solubility in water at 20° C. (±2° C.) of below 0.05 wt.-% and preferably of below 0.01 wt.-%, based on the total dry weight of the surface reactive white mineral material-containing particles.

In accordance with the present invention, the surface reactive white mineral material-containing particles of the at least one surface reactive white mineral material comprising on at least a part of the surface of the surface reactive white mineral material-containing particles a phosphoric acid ester blend of one or more phosphoric acid mono-ester and salty reaction products thereof and one or more phosphoric acid di-ester and salty reaction products thereof.

Thus, it is appreciated that at least one surface reactive white mineral material comprises, preferably consists of, surface reactive white mineral material-containing particles and a phosphoric acid ester blend of one or more phosphoric acid mono-ester and salty reaction products thereof and one or more phosphoric acid di-ester and salty reaction products thereof.

In one embodiment of the present invention, the at least one surface reactive white mineral material comprises surface reactive white mineral material-containing particles in an amount of ≥90 wt.-%, based on the total dry weight of the surface reactive white mineral material. For example, the at least one surface reactive white mineral material comprises surface reactive white mineral material-containing particles in an amount of ≥95 wt.-% and preferably of ≥97.5 wt.-%, based on the total dry weight of the surface reactive white mineral material.

It is one requirement of the present invention that the at least one surface reactive white mineral material comprises the phosphoric acid ester blend in an amount of at least 0.1 wt.-%, based on the total dry weight of the at least one surface reactive white mineral material. For example, the at least one surface reactive white mineral material comprises the phosphoric acid ester blend in an amount of at least 0.2 wt.-% or in an amount of at least 0.3 wt.-%, based on the total dry weight of the at least one surface reactive white mineral material.

In one embodiment of the present invention, the at least one surface reactive white mineral material comprises the phosphoric acid ester blend in an amount of from 0.1 to 5 wt.-%, based on the total dry weight of the surface reactive white mineral material. For example, the at least one surface reactive white mineral material comprises the phosphoric acid ester blend in an amount of from 0.2 to 3 wt.-% and preferably of from 0.3 to 2 wt.-%, based on the total dry weight of the surface reactive white mineral material.

Accordingly, it is appreciated that the at least one surface reactive white mineral material comprises surface reactive white mineral material-containing particles in an amount of ≥90 wt.-% and the phosphoric acid ester blend in an amount of from 0.1 to 5 wt.-%, based on the total dry weight of the surface reactive white mineral material. Alternatively, the at least one surface reactive white mineral material comprises surface reactive white mineral material-containing particles in an amount of ≥95 wt.-% and the phosphoric acid ester blend in an amount of from 0.2 to 3 wt.-%, based on the total dry weight of the surface reactive white mineral material. Alternatively, the at least one surface reactive white mineral material comprises surface reactive white mineral material-containing particles in an amount of ≥97.5 wt.-% and the coating layer in an amount of from 0.3 to 2 wt.-%, based on the total dry weight of the surface reactive white mineral material.

At least a part of the surface of the surface reactive white mineral material-containing particles of the at least one surface reactive white mineral material comprises a phosphoric acid ester blend of one or more phosphoric acid mono-ester and salty reaction products thereof and one or more phosphoric acid di-ester and salty reaction products thereof Alkyl esters of phosphoric acid are well known in the industry especially as surfactants, lubricants and antistatic agents (Die Tenside; Kosswig and Stache, Carl Hansen Verlag Munchen, 1993).

The synthesis of alkyl esters of phosphoric acid by different methods and the surface treatment of minerals with alkyl esters of phosphoric acid are well known by the skilled man, e.g. from Pesticide Formulations and Application Systems: 15th Volume; Collins H M, Hall F R, Hopkinson M, STP1268; Published: 1996, U.S. Pat. Nos. 3,897,519, 4,921,990, 4,350,645, 6,710,199, 4,126,650, 5,554,781, EP 1092000 B1 and WO 2008/023076.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from C6 to C30 in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the coating layer of the at least one calcium carbonate-containing material and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the surface of the surface reactive white mineral material-containing particles of the at least one surface reactive white mineral material comprises a phosphoric acid ester blend of one phosphoric acid mono-ester and salty reaction products thereof and one phosphoric acid di-ester and salty reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

If at least a part of the surface of the surface reactive white mineral material-containing particles of the at least one surface reactive white mineral material comprises a phosphoric acid ester blend of one phosphoric acid mono-ester and salty reaction products thereof and one phosphoric acid di-ester and salty reaction products thereof, it is appreciated that the alcohol substituent of the one phosphoric acid mono-ester and the one phosphoric acid di-ester are preferably the same. For example, at least a part of the surface of the surface reactive white mineral material-containing particles of the at least one surface reactive white mineral material comprises a phosphoric acid ester blend of 2-ethylhexyl phosphoric acid mono-ester and salty reaction products thereof and 2-ethylhexyl phosphoric acid di-ester and salty reaction products thereof. Alternatively, at least a part of the surface of the surface reactive white mineral material-containing particles of the at least one surface reactive white mineral material comprises a phosphoric acid ester blend of 2-octyl-1-decyl phosphoric acid mono-ester and salty reaction products thereof and 2-octyl-1-decyl phosphoric acid di-ester and salty reaction products thereof. Alternatively, at least a part of the surface of the surface reactive white mineral material-containing particles of the at least one surface reactive white mineral material comprises a phosphoric acid ester blend of hexadecyl phosphoric acid mono-ester and salty reaction products thereof and hexadecyl phosphoric acid di-ester and salty reaction products thereof. Alternatively, at least a part of the surface of the surface reactive white mineral material-containing particles of the at least one surface reactive white mineral material comprises a phosphoric acid ester blend of octadecyl phosphoric acid mono-ester and salty reaction products thereof and octadecyl phosphoric acid di-ester and salty reaction products thereof. Alternatively, at least a part of the surface of the surface reactive white mineral material-containing particles of the at least one surface reactive white mineral material comprises a phosphoric acid ester blend of 2-octyl-1-dodecylphosphoric acid mono-ester and salty reaction products thereof and 2-octyl-1-dodecylphosphoric acid di-ester and salty reaction products thereof.

In one embodiment of the present invention, the phosphoric acid ester blend of two or more phosphoric acid mono-esters and salty reaction products thereof and two or more phosphoric acid di-ester and salty reaction products thereof. In this case, the two or more phosphoric acid mono-esters are selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester and 2-octyl-1-dodecylphosphoric acid mono-ester, the two or more phosphoric acid di-ester are selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester and 2-octyl-1-dodecylphosphoric acid di-ester.

In one embodiment of the present invention, the phosphoric acid ester blend of two phosphoric acid mono-esters and salty reaction products thereof and two phosphoric acid di-esters and salty reaction products thereof. For example, at least a part of the surface of the surface reactive white mineral material-containing particles of the at least one surface reactive white mineral material comprises a phosphoric acid ester blend of hexadecyl phosphoric acid mono-ester, octadecyl phosphoric acid mono-ester, hexadecyl phosphoric acid di-ester, octadecyl phosphoric acid di-ester and salty reaction products thereof and salty reaction products thereof.

It is one requirement of the present invention, that the phosphoric acid ester blend of the at least one surface reactive white mineral material comprises the one or more phosphoric acid mono-ester and salty reaction products thereof to the one or more phosphoric acid di-ester and salty reaction products thereof in a specific molar ratio. In particular, the molar ratio of the one or more phosphoric acid mono-ester and salty reaction products thereof to the one or more phosphoric acid di-ester and salty reaction products thereof in the coating layer and/or the phosphoric acid ester blend is from 1:1 to 1:100.

The wording "molar ratio of" the one or more phosphoric acid mono-ester and salty reaction products thereof to the one or more phosphoric acid di-ester and salty reaction products thereof in the meaning of the present invention refers to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof.

In one embodiment of the present invention, the molar ratio of the one or more phosphoric acid mono-ester and salty reaction products thereof to the one or more phosphoric acid di-ester and salty reaction products thereof in the phosphoric acid ester blend of the at least one surface reactive white mineral material is from 1:1.1 to 1:80. For example, the molar ratio of the one or more phosphoric acid mono-ester and salty reaction products thereof to the one or more phosphoric acid di-ester and salty reaction products thereof in the phosphoric acid ester blend of the at least one surface reactive white mineral material is from 1:1.1 to 1:60, more preferably from 1:1.1 to 1:40, even more preferably from 1:1.1 to 1:20 and most preferably from 1:1.1 to 1:10.

Additionally or alternatively, the phosphoric acid ester blend of the at least one surface reactive white mineral material comprises the one or more phosphoric acid mono-ester and salty reaction products thereof in an amount of from 1 to 50 mol.-%, based on the molar sum of the one or more phosphoric acid mono-ester and salty reaction products thereof and the one or more phosphoric acid di-ester and salty reaction products thereof. For example, the phosphoric acid ester blend of the at least one surface reactive white mineral material comprises the one or more phosphoric acid mono-ester and salty reaction products thereof in an amount of from 10 to 45 mol.-%, based on the molar sum of the one or more phosphoric acid mono-ester and salty reaction products thereof and the one or more phosphoric acid di-ester and salty reaction products thereof.

In one embodiment of the present invention, the phosphoric acid ester blend of the at least one surface reactive white mineral material further comprises one or more phosphoric acid tri-ester and/or phosphoric acid and salty reaction products thereof.

In one embodiment of the present invention, the phosphoric acid ester blend of the at least one surface reactive white mineral material further comprises one or more phosphoric acid tri-ester and phosphoric acid and salty reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the surface of the surface reactive white mineral material-containing particles.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

In one embodiment of the present invention, the one or more phosphoric acid tri-ester consists of an o-phosphoric acid molecule esterified with three alcohols selected from the same or different, unsaturated or saturated, branched or linear, aliphatic or aromatic alcohols having a total amount of carbon atoms from C6 to C30 in the alcohol substituent. For example, the one or more phosphoric acid tri-ester consists of an o-phosphoric acid molecule esterified with three alcohols selected from the same or different, unsaturated or saturated, branched or linear, aliphatic or aromatic fatty alcohols having a total amount of carbon atoms from C8 to C22, more preferably from C8 to C20 and most preferably from C8 to C18 in the alcohol substituent.

It is appreciated that the three alcohols used for esterifying the phosphoric acid may be independently selected from unsaturated or saturated, branched or linear, aliphatic or aromatic alcohols having a total amount of carbon atoms from C6 to C30 in the alcohol substituent. In other words, the one or more phosphoric acid tri-ester molecule may comprise three substituents being derived from the same alcohols or the phosphoric acid tri-ester molecule may comprise three substituents being derived from different alcohols.

In one embodiment of the present invention, the one or more phosphoric acid tri-ester consists of an o-phosphoric acid molecule esterified with three alcohols selected from the same or different, saturated and linear or branched and aliphatic alcohols having a total amount of carbon atoms from C6 to C30 in the alcohol substituent. For example, the one or more phosphoric acid tri-ester consists of an o-phosphoric acid molecule esterified with three alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid tri-ester consists of an o-phosphoric acid molecule esterified with three alcohols selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid tri-ester consists of an o-phosphoric acid molecule esterified with three alcohols selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid tri-ester is selected from the group comprising hexyl phosphoric acid tri-ester, heptyl phosphoric acid tri-ester, octyl phosphoric acid tri-ester, 2-ethylhexyl phosphoric acid tri-ester, nonyl phosphoric acid tri-ester, decyl phosphoric acid tri-ester, undecyl phosphoric acid tri-ester, dodecyl phosphoric acid tri-ester, tetradecyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

For example, the one or more phosphoric acid tri-ester is selected from the group comprising 2-ethylhexyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

In one embodiment of the present invention, at least a part of the surface of the surface reactive white mineral material-containing particles of the at least one surface reactive white mineral material comprises a phosphoric acid ester blend of one or more phosphoric acid mono-ester and salty reaction products thereof and one or more phosphoric acid di-ester and salty reaction products thereof and one or more phosphoric acid tri-ester and optionally phosphoric acid and salty reaction products thereof. For example, at least a part of the surface of the surface reactive white mineral material-containing particles of the at least one surface reactive white mineral material comprises a phosphoric acid ester blend of the one or more phosphoric acid mono-ester and salty reaction products thereof and one or more phosphoric acid di-ester and salty reaction products thereof and one or more phosphoric acid tri-ester and phosphoric acid and salty reaction products thereof.

Alternatively, at least a part of the surface of the surface reactive white mineral material-containing particles of the at least one surface reactive white mineral material comprises a phosphoric acid ester blend of the one or more phosphoric acid mono-ester and salty reaction products thereof and one or more phosphoric acid di-ester and salty reaction products thereof and optionally phosphoric acid and salty reaction products thereof. For example, at least a part of the surface of the surface reactive white mineral material-containing particles of the at least one surface reactive white mineral material comprises a phosphoric acid ester blend of the one or more phosphoric acid mono-ester and salty reaction products thereof and one or more phosphoric acid di-ester and salty reaction products thereof and phosphoric acid and salty reaction products thereof.

If at least a part of the surface of the surface reactive white mineral material-containing particles of the at least one surface reactive white mineral material comprises a phosphoric acid ester blend comprising one or more phosphoric acid tri-ester, it is preferred that the phosphoric acid ester blend comprises the one or more phosphoric acid tri-ester in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the one or more phosphoric acid tri-ester in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

Additionally or alternatively, if at least a part of the surface of the surface reactive white mineral material-containing particles of the at least one surface reactive white mineral material comprises a phosphoric acid ester blend comprising phosphoric acid and salty reaction products thereof, it is preferred that the phosphoric acid ester blend comprises the phosphoric acid and salty reaction products thereof in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the phosphoric acid and salty reaction products thereof in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

If the phosphoric acid ester blend further comprises phosphoric acid and salty reaction products thereof and one or more phosphoric acid tri-ester, it is thus preferred that the molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester in the phosphoric acid ester blend is ≤10 mol.-%:≤40 mol.-%: ≥40 mol.%:≤10 mol.-%, based on the molar sum of the one or more phosphoric acid mono-ester and salty reaction products thereof and the one or more phosphoric acid di-ester and salty reaction products thereof and the one or more phosphoric acid tri-ester and the phosphoric acid and salty reaction products thereof.

The wording "molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester" in the meaning of the present invention refers to the sum of the molecular weight of the phosphoric acid and the sum of the molecular weight of the phosphoric acid molecules in the salty reaction products thereof to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof to the sum of the molecular weight of the phosphoric acid tri-ester molecules.

It is appreciated that the phosphoric acid ester blend may comprise salty reaction products obtained from contacting the at least one surface reactive white mineral material-containing particles with the one or more phosphoric acid mono-ester and one or more phosphoric acid di-ester and optionally phosphoric acid. In such a case, the phosphoric acid ester blend preferably comprises salty reaction products such as one or more strontium, calcium, magnesium and/or aluminum salts of phosphoric acid mono-esters and one or more calcium, magnesium and/or aluminum salts of phosphoric acid di-esters and optionally one or more strontium, calcium, magnesium and/or aluminum salts of phosphoric acid.

In one embodiment of the present invention, the one or more phosphoric acid mono-ester and/or the one or more phosphoric acid di-ester and optionally the phosphoric acid may be at least partially neutralized by one or more hydroxides of a mono- and/or bi- and/or trivalent cation and/or one or more salts of a weak acid of a mono- and/or bi- and/or trivalent cation before the at least one calcium carbonate-containing material is prepared. The one or more hydroxides of a bi- and/or trivalent cation may be selected from $Ca(OH)_2$, $Mg(OH)_2$, $Al(OH)_3$ and mixtures thereof.

Additionally or alternatively, if the one or more phosphoric acid mono-ester and/or the one or more phosphoric acid di-ester and optionally the phosphoric acid is at least partially neutralized by one or more hydroxides and/or one or more salts of a weak acid of a monovalent cation, the amount of monovalent cations is preferably ≤10 mol.-%, based on the molar sum of acidic groups in the one or more phosphoric acid mono-ester and the one or more phosphoric acid di-ester and optionally the phosphoric acid, the one or more hydroxide and/or the one or more salt of a weak acid of a monovalent cation to neutralize may be selected from LiOH, NaOH, KOH, $Na_2CO_3$, $Li_2CO_3$, $K_2CO_3$ and mixtures thereof.

In one embodiment of the present invention, the bivalent cations used for the partial neutralization of the one or more phosphoric acid mono-ester and/or the one or more phosphoric acid di-ester and optional the phosphoric acid are derived from salts of weak acids of such cations, preferably from carbonates and/or borates, such as calcium carbonate.

The term "weak acid" in the meaning of the present application refers to a Bronsted-Lowry acid, i.e. an $H_3O^+$-ion provider, featuring a $pK_a$ of ≥2, preferably from 4 to 7.

Accordingly, the phosphoric acid ester blend of the at least one surface reactive white mineral material may further comprise salty reaction products such as one or more magnesium salts of phosphoric acid mono-esters and one or more magnesium salts of phosphoric acid di-ester and optionally one or more magnesium salts of phosphoric acid.

Additionally or alternatively, the phosphoric acid ester blend of the at least one surface reactive white mineral material further comprises salty reaction products such as one or more aluminum salts of phosphoric acid mono-esters and one or more aluminum salts of phosphoric acid di-ester and optionally one or more aluminum salts of phosphoric acid. Additionally or alternatively, phosphoric acid ester blend of the at least one surface reactive white mineral material further comprises salty reaction products such as one or more lithium salts of phosphoric acid mono-esters and one or more lithium salts of phosphoric acid di-ester and optionally one or more lithium salts of phosphoric acid. Additionally or alternatively, the phosphoric acid ester blend of the at least one surface reactive white mineral material further comprises salty reaction products such as one or more sodium salts of phosphoric acid mono-esters and one or more sodium salts of phosphoric acid di-ester and optionally one or more sodium salts of phosphoric acid. Additionally or alternatively, the phosphoric acid ester blend of the at least one surface reactive white mineral material further comprises salty reaction products such as one or more potassium salts of phosphoric acid mono-esters and one or more potassium salts of phosphoric acid di-ester and optionally one or more potassium salts of phosphoric acid.

If the one or more phosphoric acid mono-ester and/or the one or more phosphoric acid di-ester and optionally the phosphoric acid is at least partially neutralized by one or more hydroxides and/or one or more salts of a weak acid of a monovalent cation, the coating layer and/or the phosphoric acid ester blend preferably comprises an amount of monovalent cations of ≤10 mol.-%, based on the molar sum of acidic groups in the one or more phosphoric acid mono-ester and the one or more phosphoric acid di-ester and optionally the phosphoric acid.

In one embodiment of the present invention, the phosphoric acid ester blend of the at least one surface reactive white mineral material may further comprise additional surface treatment agents that do not correspond to the one or more phosphoric acid mono-ester, one or more phosphoric acid di-ester and the optional one or more phosphoric acid tri-ester and/or phosphoric acid of the present invention. Such additional surface treatment agents are preferably at least one organic material such as a polysiloxane. For example, the polysiloxane is preferably a polydimethylsiloxane (PDMS).

The polysiloxane is preferably present in a quantity such that the total amount of said polysiloxane on at least a part of the surface of the at least one surface reactive white mineral material-containing particles of the at least one surface reactive white mineral material is less than 1 000 ppm, more preferably less than 800 ppm and most preferably less than 600 ppm. For example, the total amount of the polysiloxane on at least a part of the surface of the at least one surface reactive white mineral material-containing particles of the at least one surface reactive white mineral material is from 100 to 1 000 ppm, more preferably from 200 to 800 ppm and most preferably from 300 to 600 ppm, e.g. from 400 to 600 ppm.

In one embodiment of the present invention, the phosphoric acid ester blend of the at least one surface reactive white mineral material contains <50 ppm of C6 to C30 carboxylic acids.

Furthermore, it is one requirement of the present invention that the at least one surface reactive white mineral material has specific characteristics.

In particular, it is one requirement of the present invention that the at least one surface reactive white mineral material a volatile onset temperature of ≥250° C. For example, the at least one surface reactive white mineral material features a volatile onset temperature of ≥255° C., preferably of ≥265° C. and most preferably of ≥270° C.

Additionally or alternatively, the at least one surface reactive white mineral material features a total volatiles between 25 and 350° C. of less than 0.25%, and preferably of less than 0.23% by mass, e.g. of from 0.04 to 0.21% by mass, preferably from 0.08 to 0.15% by mass, more preferably from 0.1 to 0.12% by mass.

Furthermore, the at least one surface reactive white mineral material features a low moisture pick up susceptibility. It is preferred that the moisture pick up susceptibility of the at least one surface reactive white mineral material is such that its total surface moisture level is ≤0.8 mg/g of dry surface reactive white mineral material, at a temperature of about +23° C. (±2° C.). For example, the at least one surface reactive white mineral material has a moisture pick up susceptibility of less than 0.7 mg/g, more preferably of less than 0.6 mg/g and most preferably of less than 0.5 mg/g of dry surface reactive white mineral material at a temperature of +23° C. (±2° C.). In one embodiment of the present invention, the at least one surface reactive white mineral material has a moisture pick up susceptibility of between 0.1 and 0.8 mg/g, more preferably of between 0.2 and 0.7 mg/g and most preferably of between 0.3 and 0.6 mg/g of dry surface reactive white mineral material at a temperature of +23° C. (±2° C.).

It is a further requirement of the present invention that the at least one surface reactive white mineral material has a hydrophilicity of below 8:2 volumetric ratio of water:ethanol measured at +23° C. (±2° C.) with the sedimentation method. For example, the at least one surface reactive white mineral material has a hydrophilicity of below 7:3 volumetric ratio of water:ethanol measured at +23° C. (±2° C.) with the sedimentation method.

According to another aspect of the present invention, a process for preparing the surface reactive white mineral material as defined above is provided. The process comprising the steps of:
 (a) providing surface reactive white mineral material-containing particles having a weight median particle size $d_{50}$ of ≤7.5 μm, and having a solubility in water at 20° C. (±2° C.) of below 0.1 wt.-%, based on the total dry weight of the surface reactive white mineral material-containing particles;
 (b) providing a phosphoric acid ester blend comprising one or more phosphoric acid mono-ester and one or more phosphoric acid di-ester, and optionally one or more phosphoric acid tri-ester and/or phosphoric acid, wherein the molar ratio of the one or more phosphoric acid mono-ester to the one or more phosphoric acid di-ester in the phosphoric acid ester blend is from 1:1 to 1:100;

(c) contacting said surface reactive white mineral material-containing particles of step (a), in one or more steps, with the phosphoric acid ester blend of step (b) such that a phosphoric acid ester blend comprising one or more phosphoric acid mono-ester and salty reaction products thereof and one or more phosphoric acid di-ester and salty reaction products thereof and optionally one or more phosphoric acid tri-ester and/or phosphoric acid and salty reaction products thereof is formed on at least a part of the surface of said surface reactive white mineral material-containing particles of step (a);

wherein, before and/or during step (c), the temperature is adjusted such that the phosphoric acid ester blend of step (b) is liquid.

A "liquid" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning calorimetry, DSC, (DIN 51005: 1983-11).

With regard to the surface reactive white mineral material prepared by the process, the surface reactive white mineral material-containing particles provided in step a), the phosphoric acid mono-ester and one or more phosphoric acid di-ester, and optional one or more phosphoric acid tri-ester and/or phosphoric acid that may be provided in the phosphoric acid ester blend of step b), it is referred to the definitions set out above when defining the surface reactive white mineral material, the surface reactive white mineral material-containing particles, the phosphoric acid mono-ester and one or more phosphoric acid di-ester, and one or more phosphoric acid tri-ester and/or phosphoric acid.

It is one requirement of the present invention that the molar ratio of the one or more phosphoric acid mono-ester to the one or more phosphoric acid di-ester in the phosphoric acid ester blend provided in step (b) is from 1:1 to 1:100.

In one embodiment of the present invention, the molar ratio of the one or more phosphoric acid mono-ester to the one or more phosphoric acid di-ester in the phosphoric acid ester blend provided in step (b) is from 1:1.1 to 1:80. For example, the molar ratio of the one or more phosphoric acid mono-ester to the one or more phosphoric acid di-ester in the phosphoric acid ester blend provided in step (b) is from 1:1.1 to 1:60, more preferably from 1:1.1 to 1:40, even more preferably from 1:1.1 to 1:20 and most preferably from 1:1.1 to 1:10.

In one embodiment of the present invention, the phosphoric acid ester blend provided in step (b) comprises the one or more phosphoric acid mono-ester in an amount of from 1 to 50 mol.-% and preferably of from 10 to 45 mol.-%, based on the molar sum of the one or more phosphoric acid mono-ester and the one or more phosphoric acid di-ester.

It is appreciated that the phosphoric acid ester blend provided in step (b) may further comprise one or more phosphoric acid tri-ester and/or phosphoric acid. For example, the phosphoric acid ester blend provided in step (b) further comprises one or more phosphoric acid tri-ester and phosphoric acid.

If the phosphoric acid ester blend provided in step (b) further comprises phosphoric acid and one or more phosphoric acid tri-ester, it is preferred that the molar ratio of the phosphoric acid to the one or more phosphoric acid mono-ester to the one or more phosphoric acid di-ester to the one or more phosphoric acid tri-ester in the phosphoric acid ester blend is ≤10 mol.-%:≤40 mol.-%:≥40 mol. %:≤10 mol.-%, based on the molar sum of the one or more phosphoric acid mono-ester and the one or more phosphoric acid di-ester the one or more phosphoric acid tri-ester and the phosphoric acid.

In one embodiment of the present invention, the phosphoric acid ester blend of step (b) is provided in that the one or more phosphoric acid mono-ester and/or the one or more phosphoric acid di-ester and optionally the phosphoric acid are at least partially neutralized by one or more hydroxides of a mono- and/or bi- and/or trivalent cation. For example, the one or more phosphoric acid mono-ester and the one or more phosphoric acid di-ester and optionally the phosphoric acid in the phosphoric acid ester blend of step (b) are at least partially neutralized by one or more hydroxides of a mono- and/or bi- and/or trivalent cation and/or one or more salts of a weak acid of a mono- and/or bi- and/or trivalent cation. Accordingly, such at least partially neutralizing of the one or more phosphoric acid mono-ester and/or the one or more phosphoric acid di-ester and optionally the phosphoric acid is preferably carried out before contacting step (c) is carried out. It is preferred that the one or more hydroxides of a mono- and/or bi- and/or trivalent cation may be selected from $Ca(OH)_2$, $Mg(OH)_2$, $Al(OH)_3$ and mixtures thereof. Additionally or alternatively, the one or more hydroxide and/or the one or more salts of a weak acid of a monovalent cation may be selected from LiOH, NaOH, KOH, $Na_2CO_3$, $Li_2CO_3$, $K_2CO_3$ and mixtures thereof.

It is preferred that the phosphoric acid ester blend of step (b) comprises an amount of monovalent cations like lithium, sodium and/or potassium of ≤10 mol.-%, based on the molar sum of acidic groups in the one or more phosphoric acid mono-ester and the one or more phosphoric acid di-ester and optionally the phosphoric acid.

In a further preferred embodiment of the present invention, the phosphoric acid mono-esters and phosphoric acid di-esters and phosphoric acid in the phosphoric acid ester blend of step (b) are at least partially neutralized with ammoniac and/or amines, more preferably with alkanolamines, most preferably triisopropanolamine.

The step of contacting the surface reactive white mineral material-containing particles of step (a), in one or more steps, with the phosphoric acid ester blend of step (b) preferably takes place under mixing conditions. The skilled man will adapt these mixing conditions (such as the configuration of mixing pallets and mixing speed) according to his process equipment.

In one embodiment, the inventive process may be a continuous process. In this case, it is possible to contact the surface reactive white mineral material-containing particles with the phosphoric acid ester blend of step (b) in a constant flow, so that a constant concentration of the phosphoric acid ester blend is provided during the step of contacting.

Alternatively, the surface reactive white mineral material-containing particles are contacted with the phosphoric acid ester blend of step (b) in one step, wherein said phosphoric acid ester blend is preferably added in one portion.

In another embodiment, the inventive process may be a batch process, i.e. the surface reactive white mineral material-containing particles are contacted with the phosphoric acid ester blend of step (b) in more than one steps, wherein said phosphoric acid ester blend is preferably added in about equal portions. Alternatively, it is also possible to add the phosphoric acid ester blend in unequal portions to the surface reactive white mineral material-containing particles, i.e. in larger and smaller portions.

According to one embodiment of the present invention, contacting step (c) is carried out in a batch or continuous process for a period of time from 0.1 to 1000 s. For example, contacting step (c) is a continuous process and comprises one or several contacting steps and the total contacting time is from 0.1 to 20 s, preferably from 0.5 to 15 s and most preferably from 1 to 10 s.

It is one requirement of the inventive process that the temperature is adjusted during step (c) such that the one or more phosphoric acid mono-ester and the one or more phosphoric acid di-ester and optionally phosphoric acid tri-ester in the phosphoric acid ester blend of step (b) are liquid. In one embodiment of the present invention, the contacting of the surface reactive white mineral material-containing particles with the phosphoric acid ester blend of step (b) is carried out at a temperature of from 20 to 200° C., preferably from 90 to 200° C., more preferably of from 100 to 150° C. and most preferably of from 110 to 130° C.

The treatment time for carrying out the contacting of the surface reactive white mineral material-containing particles with the phosphoric acid ester blend of step (b) is carried out for a period of 1 000 s or less, preferably for a period of 500 s or less, more preferably for a period of 250 s or less and most preferably from 0.1 to 1 000 s. For example, contacting step (c) is carried out for a period of time from 0.1 to 20 s, preferably from 0.5 to 15 s and most preferably from 1 to 10 s. In general, the length of contacting the surface reactive white mineral material-containing particles with the phosphoric acid ester blend of step (b) is determined by the treatment temperature applied during said contacting. For example, where a treatment temperature of about 200° C. is applied, the treatment time is as short as, for example, about 0.1. If a treatment temperature of about 90° C. is applied, the treatment time can be as long as, for example, about 1 000 s.

In one embodiment of the present invention, the surface reactive white mineral material-containing particles are preheated, i.e. activated, before contacting step (c) is carried out. That is to say, the surface reactive white mineral material-containing particles are treated at a temperature of from 90 to 200° C., preferably of from 100 to 150° C. and most preferably of from 110 to 130° C. before contacting step (c) is carried out.

The treatment time for carrying out the preheating of the surface reactive white mineral material-containing particles is carried out for a period of 30 min or less, preferably for a period of 20 min or less and more preferably for a period of 15 min or less.

In one embodiment of the present invention, the preheating of the surface reactive white mineral material-containing particles is carried out at a temperature that is of about equal to the temperature implemented during contacting step (c).

The term "equal" temperature in the meaning of the present invention refers to a preheating temperature that is at most 20° C., preferably at most 15° C., more preferably 10° C. and most preferably at most 5° C., below or above the temperature implemented during contacting step (c).

According to one embodiment of the present invention, the process further comprises step (d) of contacting the surface reactive white mineral material-containing particles of step (a), in one or more steps, with at least one organic material such as polysiloxanes.

In case, the inventive process further comprises contacting step (d), such contacting of the surface reactive white mineral material-containing particles with the at least one organic material may be carried out during and/or after the contacting of the surface reactive white mineral material-containing particles with the phosphoric acid ester blend of step (b). In one embodiment of the present invention, such contacting with the at least one organic material is carried out after the contacting of the surface reactive white mineral material-containing particles with the phosphoric acid ester blend of step (b).

In view of the very good results of the process for preparing a surface reactive white mineral material, as defined above, a further aspect of the present invention refers to a surface reactive white mineral material which is obtainable by the process according to the present invention.

The at least one surface reactive white mineral material according to the present invention imparts excellent mechanical properties to final application products such as fibers and/or filaments and/or films and/or threads and/or breathable films. In particular, the at least one surface reactive white mineral material imparts excellent mechanical properties to final application products such as fibers and/or filaments and/or films and/or threads and/or breathable films, when the at least one surface reactive white mineral materials provided in form of the polymer composition of the present invention.

Thus, the present invention refers in a further aspect to a fibre and/or filament and/or film and/or threads comprising the polymer composition as defined above and/or the calcium carbonate-containing material as defined above.

Furthermore, the present invention refers in another aspect to a method for preparing a fibre and/or filament and/or film and/or thread and/or breathable films, the method comprising at least the steps of:
  a) providing the polymer composition as defined above, and
  b) subjecting the polymer composition of step a) to conditions under which said polymer composition is converted into a fibre and/or filament and/or film and/or thread and/or breathable film.

Appropriate method conditions for preparing fibres and/or filaments and/or films and/or threads and/or breathable films are commonly known to the skilled person and/or can be established by routine modifications based on common general knowledge.

For example, the polymer composition of the present invention may advantageously be implemented in a process of mixing and/or extruding and/or compounding and/or blow moulding for preparing fibers and/or filaments and/or films and/or threads and/or breathable films, wherein the at least one polymeric resin is preferably a thermoplastic polymer selected from the group comprising homopolymers and/or copolymers of polyolefins, polyamides and/or polyesters.

The term "fiber" in the meaning of the present invention refers to a linear structure forming textile fabrics such as nonwovens which typically consist of fiber webs bonded together by e.g. mechanical methods. Accordingly, the term "fiber" is understood to refer to a finite structure.

The term "thread" in the meaning of the present invention refers to a linear structure forming textile fabrics such as nonwovens which typically consist of thread webs bonded together by e.g. mechanical methods. Accordingly, the term "thread" is understood to refer to a finite structure. The thread may be constructed as mono-, bi- or multi-thread. If a bi- or multi-thread is present, the composition of the single thread may be substantially the same. That is to say, the compositions of the single threads comprise substantially the same components, i.e. the at least one polymeric resin and at least one surface reactive white mineral material, in the same amounts. Alternatively, the composition of the single threads may be different. That is to say, the compositions of the single threads may comprise the same components, i.e. the at least one polymeric resin and at least one surface reactive white mineral material, in varying amounts or the compositions of the single threads may comprise different components, i.e. the at least one polymeric resin and/or at least one surface reactive white mineral material may be different, in the same amounts or the composition of the single threads may comprise different components, i.e. the at least one polymeric resin and/or at least one surface reactive white mineral material may be different, in varying amounts.

The term "filament" in the meaning of the present invention refers to a structure that differs from fibers by its structure length. Accordingly, the term "filament" is understood to refer to endless fibers. It is further appreciated that the filament may be constructed as mono-, bi- or multi-filament. If a bi- or multi-filament is present, the composition of the single filaments may be substantially the same. That is to say, the compositions of the single filaments comprise substantially the same components, i.e. the at least one polymeric resin and at least one surface reactive white mineral material, in the same amounts. Alternatively, the composition of the single filaments may be different. That is to say, the compositions of the single filaments may comprise the same components, i.e. the at least one polymeric resin and at least one surface reactive white mineral material, in varying amounts or the compositions of the single filaments may comprise different components, i.e. the at least one polymeric resin and/or at least one surface reactive white mineral material may be different, in the same amounts or the composition of the single filaments may comprise different components, i.e. the at least one polymeric resin and/or at least one surface reactive white mineral material may be different may be different, in varying amounts.

The cross-section of the filaments and/or fibers and/or threads may have a great variety of shapes. It is preferred that the cross-sectional shape of the filaments and/or fibers and/or threads may be round, oval or n-gonal, wherein n is ≥3, e.g. n is 3. For example, the cross-sectional shape of the filaments and/or fibers and/or threads is round or trilobal, like round. Additionally or alternatively, the cross-sectional shape of the filaments and/or fibers and/or threads is hollow.

It is appreciated that the filaments and/or fibers and/or threads may be prepared by all techniques known in the art used for preparing such filaments and/or fibers and/or threads. For example, the filaments and/or fibers and/or threads of the present invention can be prepared by the well known melt-blown process, spunbonded process or staple fibre production.

Further to this, filled PP masterbatches were used by melt extrusion processes to form fiber and filaments and continuous filament nonwoven fabrics by means known to the skilled person.

In accordance with known technology such as the continuous filament spinning for yarn or staple fiber, and nonwoven processes such as spunbond production and melt-blown production, the fibers and filaments are formed by extrusion of the molten polymer through small orifices. In general, the fibers or filaments thus formed are then drawn or elongated to induce molecular orientation and affect crystallinity, resulting in a reduction in diameter and an improvement in physical properties. Spunmelt is a generic term describing the manufacturing of nonwoven webs (fabrics) directly from thermoplastic polymers. It encompasses 2 processes (spunlaid and meltblown) and the combination of both.

In this process polymer granules are melted and molten polymer is extruded through a spinneret assembly which creates a plurality of continuous polymeric filaments. The filaments are then quenched and drawn, and collected to form a nonwoven web. Some remaining temperature can cause filaments to adhere to one another, but this cannot be regarded as the principal method of bonding. There are several methods available for forming the collected web of continuous filaments into a useful product by a bonding step, which includes, but is not be limited to calendaring, hydroentangling, needling and/or bonding by means of chemicals or adhesives.

The spunlaid process (also known as spunbonded) has the advantage of giving nonwovens greater strength. Co-extrusion of second components is used in several spunlaid processes, usually to provide extra properties or bonding capabilities. In meltblown web formation, low viscosity polymers are extruded into a high velocity airstream on leaving the spinneret. This scatters the melt, solidifies it and breaks it up into a fibrous web.

It is known to those skilled in the art to combine processes or the fabrics from different processes to produce composite fabrics which possess certain desirable characteristics. Examples of this are combining spunbond and meltblown to produce a laminate fabric that is best known as SMS, meant to represent two outer layers of spunbond fabric and an inner layer of meltblown fabric. Additionally either or both of these processes may be combined in any arrangement with a staple fiber carding process or bonded fabrics resulting from a nonwoven staple fiber carding process. In such described laminate fabrics, the layers are generally at least partially consolidated by one of the bonding steps listed above.

Processes are well known in the art, and are commercially available, for producing spunbond fabric of polypropylene polymeric resin. The two typical processes are known as the Lurgi process and the Reifenhäuser process.

The Lurgi process is based on the extrusion of molten polymer through spinneret orifices followed by the newly formed extruded filaments being quenched with air and drawn by suction through Venturi tubes. Subsequent to formation, the filaments are disbursed on a conveyor belt to form a nonwoven web.

The Reifenhäuser process differs from the Lurgi process in that the quenching area for the filaments is sealed, and the quenched air stream is accelerated, thus inducing more effective entrainment of the filaments into the air stream.

In the above-described systems, nonwoven fabrics are generally produced using polypropylene resins having a melt flow index of about 25 to 40 grams/10 minutes. A Lurgi line was used to produce polypropylene nonwovens. Extruder temperatures are between 230° and 250° C. The four spin beams are equipped with melt pumps and spinnerets which contain 600 orifices each with a diameter of 0.8 millimeters. The extruded filaments are formed to a nonwoven web. The conveyor belt speed was adjusted to 20 meters/minute and hydroentangling was used to bond the nonwoven web. Hydroentangling, also known as spunlacing, is a process which employs high pressure water jets to entangle fibers in a loose web thereby creating a fabric held together by frictional forces between the said fibers. The final bonded nonwoven web with a width of 100 cm has a fabric weight of 385 g/m2.

Samples of the said nonwoven fabrics comprising the $CaCO_3$ according to the present invention and samples of nonwoven fabrics comprising the prior art $CaCO_3$ are compared hereafter in tables 7 and 8. Different amounts of the filled masterbatches were mixed with further polypropylene (PP HF420FB, a homo-polypropylene with MFR 19 g/10 min. (230° C., 2.16 kg, ISO 1133) from *Borealis*) and nonwoven fabrics were made from these mixtures.

The term "film" or "breathable film" in the meaning of the present invention refers to a structure that differs from filaments and/or fibers by its dimensional structure. Accordingly, the term "film" or "breathable film" is understood to refer to a sheet.

It is appreciated that the films and/or breathable films may be prepared by all techniques known in the art used for preparing such films. For example, the films of the present invention can be prepared by the well known techniques used for preparing stretched/oriented films, and preferably extrusion coating films, blown films, technical blown films, monotapes, cast films and the like.

Accordingly, fibers and/or filaments and/or films and/or threads and/or breathable films according to the present invention are characterized in that they contain said polymer composition and/or surface reactive white mineral material and in that they have improved material properties such as improved mechanical properties.

As another advantage, fibers and/or filaments and/or films and/or threads and/or breathable films according to the present invention cause lower pressure decreases during film extrusion. In addition thereto, the fibers and/or filaments and/or films and/or threads and/or breathable films according to the present invention further show good mechanical properties such as tensile modulus, tensile test at yield and at break, elongation at break and tear resistance.

In view of the very good results obtained with regard to the hydrophilicity of the surface reactive white mineral material-containing particles treated with a phosphoric acid ester blend, as defined above, a further aspect of the present invention is directed to the use of the phosphoric acid ester blend for decreasing the hydrophilicity of the surface reactive white mineral material-containing particle surface. In particular, the phosphoric acid ester blend as defined above can be used to decrease the hydrophilicity of the surface reactive white mineral material-containing particle surface such that the surface reactive white mineral material-containing particles are suitable for use in fibers and/or filaments and/or films and/or threads and/or breathable films.

Another aspect of the present invention is directed to an article comprising the polymer composition as defined above and/or the surface reactive white mineral material as defined above and/or the fibre and/or filament and/or film and/or threads and/or breathable film as defined above. The article is preferably selected from the group comprising hygiene products, medical and healthcare products, filter products, geotextile products, agriculture and horticulture products, clothing, footwear and baggage products, household and industrial products, packaging products, construction products and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with nonwoven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, biodegradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The following examples may additionally illustrate the invention but are not meant to restrict the invention to the exemplified embodiments. The examples below show the reduced total volatiles, the reduced moisture pick up susceptibility and the decreased hydrophilicity of the at least one surface reactive white mineral material and the good mechanical properties of the fiber and/or filament and/or film and/or thread surface reactive white mineral material prepared from the polymer composition according to the present invention:

EXAMPLES

Measurement Methods

The following measurement methods are used to evaluate the parameters given in the examples and claims.

Measurement of the Total Volatiles

For the purpose of the present application, the "total volatiles" associated with mineral fillers and evolved over a temperature range of 25 to 350° C. is characterized according to % mass loss of the mineral filler sample over a temperature range as read on a thermogravimetric (TGA) curve.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25 to 350° C. at a rate of 20° C./minute under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 200° C. is identified.

The temperature value associated with this lowest temperature inflection point of the first derivative curve is the "volatile onset temperature".

The "total volatiles" evolved on the TGA curve is determined using Stare SW 9.01 software. Using this software, the curve is first normalised relative to the original sample weight in order to obtain mass losses in % values relative to the original sample. Thereafter, the temperature range of 25 to 350° C. is selected and the step horizontal (in German: "Stufe horizontal") option selected in order to obtain the % mass loss over the selected temperature range.

Particle Size Distribution (Mass % Particles with a Diameter <X) and Weight Median Diameter ($d_{50}$) of a Particulate Material As used herein and as generally defined in the art, the "$d_{50}$" value is determined based on measurements made by using a Sedigraph™ 5100 of Micromeritics Instrument Corporation and is defined as the size at which 50% (the median point) of the particle volume or mass is accounted for by particles having a diameter equal to the specified value.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of the mineral filler is determined using the BET method (using nitrogen as adsorbing gas), which is well known to the skilled man (ISO 9277:1995). The total surface area (in $m^2$) of the mineral filler is then obtained by multiplication of the specific surface area and the mass (in g) of the mineral filler prior to treatment.

Moisture Pick-up

The term "moisture pick-up susceptibility" in the meaning of the present invention refers to the amount of moisture absorbed on the surface of the mineral filler and is determined in mg moisture/g of the dry treated mineral filler product after exposure to an atmosphere of 10 and 85% of relative humidity, resp., for 2.5 hours at a temperature of +23° C. (±2° C.). The treated mineral filler product is first held at an atmosphere of 10% of relative humidity for 2.5 hours then the atmosphere is changed to 85% of relative humidity, where the sample is held for another 2.5 hours. The weight increase between 10% and 85% relative humidity is then used to calculate the moisture pick-up in mg moisture/g of dry treated mineral filler product. The blank value of the equipment was determined as being 0.15 to 0.2 mg/g, e.g. 0.19 mg/g. The results in the examples as outlined below are net values, i.e. the measured value minus the blank value.

Hydrophilicity

The "hydrophilicity" of a mineral filler product is evaluated at +23° C. by determining the minimum water to ethanol ratio in a volume/volume based water/ethanol-mixture needed for the settling of the majority of said mineral filler product, where said mineral filler product is deposited on the surface of said water/ethanol-mixture by passage through a house hold tea sieve. The volume/volume base is related to the volumes of both separate liquids before blending them together and do not include the volume contraction of the blend. The evaluation at +23° C. refers to a temperature of +23° C.±2° C.

A 8:2 volumetric ratio of a water/ethanol-mixture has typically a surface tension of 41 mN/m and a 6:4 volumetric ratio of a water/ethanol-mixture has typically a surface tension of 26 mN/m measured at +23° C. (±2° C.) as described in the "Handbook of Chemistry and Physics", $84^{th}$ edition, David R. Lide, 2003 (first edition 1913).

Potentiometric Titration

The samples are analysed by potentiometric titration. The samples are dissolved in a mixture of isopropanol, ethanol and acetone under heating and titrated with a 0.1 mol/L potassium hydroxide ethanol solution.

Typically the derivative showed two main signals. The first one is in the acidic region (between pH 5 and 6) and the second one between pH 10 and 11.5. The phosphoric acid mono-ester and phosphoric acid di-ester molar ratio is determined based on the proposed stoichiometry described in the book "Introduction to Surfactant Analysis by D. C. Cullum, Springer, 1994".

The phosphoric acid tri-ester content is estimated by subtracting from the actual sample weight the calculated amount of phosphoric acid mono-ester and phosphoric acid di-ester. For all samples the amount of phosphoric acid tri-ester is below 10 mol.-%.

Dart Drop Test

The dart drop test is measured according to ASTM D 1709/A.

Brightness R457

The brightness R457 is measured according to ISO 2469.

Humidity Measurement of Calcium Carbonate-containing Material

The humidity of the calcium carbonate-containing material is measured according to the Karl Fischer coulometric titration method, desorbing the moisture in an oven at 220° C. and passing it continuously into the KF coulometer (Mettler Toledo coulometric KF Titrator C30, combined with Mettler oven DO 0337) using dry $N_2$ at 100 ml/min for 10 min. A calibration curve using water has to be prepared and a blind of 10 min gas flow without a sample has to be taken into account.

Measurements Done on Filament Samples

Titer or Linear density [dtex] may be measured according to EN ISO 2062 and corresponds to the weight in grams of 10'000 m yarn. A sample of 25 or 100 meters is wound up on a standard reel under a pretension of 0.5 cN/tex and weighted on an analytical scale. The grams per 10'000 m yarn length are then calculated. Tenacity is calculated from the breaking force and the linear density, and expressed in centinewton per tex [cN/tex]. The test is carried out on a dynamometer with a constant stretching speed, applicable standards for this test are EN ISO 5079 and ASTM D 3822.

Breaking Force and Elongation at Break: The breaking force is the force needed to be applied on a yarn to make it break. It is expressed in Newton [N]. The elongation at break is the increase of the length produced by stretching a yarn to its breaking point. It is expressed as a percentage [%] of its initial length.

Tensile index is the product of tenacity [cN/tex] and the square root of the elongation at break [%].

Measurements Done on Nonwoven Samples

Fabric weight or mass per unit area [g/m$^2$] is measured according to EN ISO 9864.

Tensile properties of geotextiles are measured according to EN ISO 10319 using a wide-width strip with 200 mm width and 100 mm length on a tensile testing machine. Tensile strength [kN/m] and the elongation at maximum load [%] are measured in machine direction (MD) and in cross machine direction (CD). The energy value according to EN ISO 10319 is calculated by the tensile strength (MD+CD)/2.

Static puncture resistance (CBR test) in [kN] is measured according to EN ISO 12236. This method specifies the determination of the puncture resistance by measuring the force required to push a flat-ended plunger through geosynthetics.

Ash content in [%] of the fibers and the masterbatches is determined by incineration of a sample in an incineration crucible which is put into an incineration furnace at 570° C. for 2 hours. The ash content is measured as the total amount of remaining inorganic residues.

Example 1

This example relates to the preparation of the calcium carbonate-containing material according to the present invention.

500 g of a wet ground and spray dried marble from Carrara, Italy, wet ground at 25 wt.-% in tap water in horizontal ball mill (Dynomill) and spray dried, featuring a $d_{50}$ of approximately 1.6 microns, a specific surface area of 4.1 m$^2$/g, a brightness R457 of 94.5% and a humidity of 0.05 wt.-% was added to a MTI Mixer. The sample was activated for 10 minutes at 120° C. and 3000 rpm. Thereafter the treatment agent (phosphoric acid mono-ester and phosphoric acid di-ester and optionally phosphoric acid tri-ester and/or phosphoric acid) was introduced to the mixer in a quantity as indicated in Table 1. The contents of the mixer were mixed at 120° C. under a stirring speed of 3000 rpm for a period of 10 minutes.

Subsequently, the samples were stored in a closed plastic bag. For analysis purposes the sample were directly taken out of the closed plastic bag and analyzed immediately.

TABLE 1

|  | PA | PA | IE |
|---|---|---|---|
| Test | 1 | 2 | 3 |
| Treatment agent | TA1 | TA2 | TA3 |
| Treatment level [wt.-%] | 0.6 | 1.2 | 0.6 |

TA1: relates to a mixture of 2-ethylhexyl phosphoric acid mono- and di-ester. The ratio between phosphoric acid mono-ester and phosphoric acid di-ester is 65 mol.-%: 35 mol.-%. The tri-ester content is below 10 wt.-%.

TA2: relates to a mixture of 2-octyldecan phosphoric acid mono- and di-ester. The ratio between phosphoric acid mono-ester and phosphoric acid di-ester is 63 mol.-%: 37 mol.-%. The tri-ester content is below 10 wt.-%.

TA3: relates to a mixture of 2-octyl-1-dodecane phosphoric acid mono- and di-ester. The ratio between phosphoric acid mono-ester and phosphoric acid di-ester is 45 mol.-%: 55 mol.-%. The phosphoric acid tri-ester content is below 10 wt.-%.

The materials obtained as described above were thereafter analyzed; the results are outlined in Table 2.

TABLE 2

|  | PA | PA | IE |
|---|---|---|---|
| Test | 1 | 2 | 3 |
| Water pick-up [mg/g] | 1.09 | 0.87 | 0.56 |
| OST [° C.] | 275 | 293 | 280 |
| Hydrophilicity [vol./vol.-%] | 100 | 100 | 60 |

From the data given in Table 2, it can be gathered that the calcium carbonate-containing material of the present invention shows excellent properties. In particular, it is shown that the calcium carbonate-containing material of the present invention has a moisture pick up susceptibility of less than 0.8 mg/g, a volatile onset temperature of ≥250° C., and a hydrophilicity of below 8:2 volumetric ratio of water:ethanol (80 vol./vol.-% water).

Example 2

This example relates to the preparation of a blown film comprising the calcium carbonate-containing material and at least one polymeric resin.

The details regarding the blown film polymer compositions, based on the total weight of the obtained film, are described in Table 3.

TABLE 3

| Polymer compositions | [g/cm³] | F0 | F1 | F2 |
|---|---|---|---|---|
| Polymer resin*¹ | 0.924 | 100 | 40 | 40 |
| Treated carbonate A*² | 2.7 | | 60 | |
| Test IE 3 of Table 2 | 2.7 | | | 60 |

The polymer compositions used for preparing the blown film were afterwards diluted to 20 wt.-% calcium carbonate-containing material, based on the total weight of the obtained film.

*¹ Polymer resin relates to a linear low density polyethylene resin (LLDPE) which is commercially available as Dowlex NG 5056G from Dow Chemical Company, Dow Europe GmbH, Horgen, Switzerland.

*² Treated carbonate A is a hydrophobic, fatty acid surface treated dry ground calcium carbonate (marble from Italy) having a medium diameter ($d_{50}$) of 1.7 μm and a top cut (d98) of 6.8 μm and 57 wt.-% of the particles have a diameter of below 2 μm. Polymer compositions F0 contains only the pure polymer resin, no calcium carbonate-containing material is included.

The blown film was prepared on a Collin blown film line with a film grammage of 37.5 g/m² and a film thickness of 40 μm.

The fiber and/or filament and/or film and/or thread according to the inventive examples show excellent mechanical properties such as shown in FIG. 1.

FIG. 1 demonstrates clearly that the inventive fiber and/or filament and/or film and/or thread comprising the inventive polymer composition show increased values in dart drop. In particular, it is shown that the values determined for the dart drop of the fiber and/or filament and/or film and/or thread according to the inventive examples are significantly higher than the values determined for the sample consisting only of the polymeric resin (F0) as well as for the standard sample (F1).

It is further appreciated that the polymer blend comprising the inventive polymer composition and which is used for preparing the fiber and/or filament and/or film and/or thread also shows an excellent filter pressure value (FPV) as can be gathered from Table 4.

TABLE 4

| Sample | FPV, 16 g GCC, 14 μm screen [bar/g] |
|---|---|
| F1 | 1.8 |
| F2 | 0.8 |

Example 3

Comparative Example

This example relates to the preparation of a platy none surface reactive silicate containing material.

500 g of Mica™, Aspanger Bergbau und Mineralwerke, Aspang, Austria featuring a $d_{50}$ of approximately 9.3 microns and a specific surface area of 5.5 m²/g and a humidity of <1 wt.-% was added to a MTI Mixer. The sample was activated for 10 minutes at 120° C. and 3000 rpm. Thereafter the treatment agent TA3 (see description under Table 1) was introduced to the mixer in a quantity of 0.6 wt.-% in respect to Mica™ as indicated in Table 5 (Test 4). The contents of the mixer were mixed at 120° C. under a stirring speed of 3000 rpm for a period of 10 minutes. Subsequently, the sample was stored in a closed plastic bag. For analysis purposes the sample was directly taken out of the closed plastic bag and analyzed immediately.

For reference purposes, 500 g of Mica™, Aspanger Bergbau und Mineralwerke, Aspang, Austria featuring a $d_{50}$ of approximately 9.3 microns and a specific surface area of 5.5 m²/g and a humidity of <1 wt.-% was added to a MTI Mixer. No treatment agent was introduced to the mixer as also indicated in Table 5 (Test 5). The sample was activated for 10 minutes at 120° C. and 3000 rpm. Thereafter the sample was further mixed at 120° C. under a stirring speed of 3000 rpm for a period of 10 minutes. Subsequently, the sample was stored in a closed plastic bag. For analysis purposes the sample was directly taken out of the closed plastic bag and analyzed immediately.

TABLE 5

| | PA | PA |
|---|---|---|
| Test | 4 | 5 (blind) |
| Treatment agent | TA3 | — |
| Treatment level [wt.-%] | 0.6 | — |

A sample of each of the materials obtained as described above was thereafter analyzed; the results are outlined in Table 6. From each sample, two separate measurements were made.

TABLE 6

| | PA | PA |
|---|---|---|
| Test | 4 | 5 |
| Water pick-up [mg/g] | 2.18/2.19 | 2.55/2.65 |

From the data given in Table 6, it can be gathered that mineral materials which are not surface reactive as defined for the present invention shows a much higher moisture pick-up susceptibility (2.18 and 2.19 mg/g of sample PA4) compared to inventive sample IE3 above (0.56 mg/g; see Table 2 above). The moisture pick-up susceptibility of the surface treated mica (2.18 and 2.19 mg/g of sample PA4) is nearly as high as measured for the reference sample PA5 (2.55 and 2.65 mg/g).

Example 4

This example relates to the preparation of a nonwoven fabric comprising the surface treated filler material product prepared in accordance with the present invention and at least one polymeric resin.

Samples of the said nonwoven fabrics comprising the $CaCO_3$ according to the present invention and samples of nonwoven fabrics comprising the prior art $CaCO_3$ are compared hereafter in tables 7 and 8. Different amounts of the filled masterbatches were mixed with further polypropylene (PP HF420FB, a homo-polypropylene with MFR 19 g/10 min. (230° C., 2.16 kg, ISO 1133) from *Borealis*) and nonwoven fabrics were made from these mixtures.

TABLE 7

| | Norm | Unit | 1 | 2 | 3 |
|---|---|---|---|---|---|
| Formulation | | | | | |
| Polypropylene HF420FB | | | 100 | 96 | 96 |
| 70% MB Invention 1 | | | | 4 | |
| 70% MB Prior Art 1 | | | | | 4 |
| Tests | | | | | |
| On Filaments | | | | | |
| Linear density | | dtex | 9.3 | 10.2 | 9.7 |
| Tenacity | | cN/dtex | 2.26 | 1.97 | 2.09 |
| Elongation | | % | 252 | 242 | 229 |
| Tensile index | | — | | 359 | 306 | 316 |
| On Nonwoven | | | | | |
| Fabric weight | EN ISO 9864 | g/m² | 372 | 390 | 387 |
| Coefficient CBR | EN ISO12236 | N/g | 7.5 | 7.1 | 7.1 |
| CBR | EN ISO12236 | N | 2766 | 2764 | 2741 |
| Tensile Strength (MD + CD)/2 | EN ISO 12319 | N/g | 10.6 | 9.1 | 9.3 |
| Ash content | | % | 0 | 2.5 | 3.0 |

¹MD refers to machine direction,
²CD refers to cross direction.

TABLE 8

| | Norm | Unit | 1 | 2 | 3 |
|---|---|---|---|---|---|
| Formulation | | | | | |
| Polypropylene HF420FB | | | 100 | 90 | 90 |
| 70% MB Invention1 | | | | 10 | |
| 70% MB Prior Art 1 | | | | | 10 |
| Tests | | | | | |
| On Filaments | | | | | |
| Linear density | | dtex | 9.3 | 10.1 | 10.0 |
| Tenacity | | cN/dtex | 2.26 | 2.0 | 1.87 |
| Elongation | | % | 252 | 244 | 226 |
| Tensile index | | — | 359 | 299 | 281 |
| On Nonwoven | | | | | |
| Fabric weight | EN ISO 9864 | g/m² | 372 | 396 | 401 |
| Coefficient CBR | EN ISO12236 | N/g | 7.5 | 6.3 | 6.2 |
| CBR | EN ISO12236 | N | 2766 | 2486 | 2479 |
| Tensile Strength (MD + CD)/2 | EN ISO 12319 | N/g | 10.6 | 8.0 | 7.6 |
| Ash content | | % | 0 | 5.9 | 7.0 |

¹MD refers to machine direction,
²CD refers to cross direction

70% MB Invention 1 refers to 70 wt % of a masterbatch of 28 wt % PP HH450 FB homo-polypropylene with MFR 37 g/10 min. (230° C., 2.16 kg, ISO 1133) from *Borealis* and 2 wt % Irgastab FS 301, processing and thermal stabilizer from BASF and 70 wt % of $CaCO_3$ according to the present invention, wherein the treated $CaCO_3$ has a median particles size diameter d50 of 1.7 μm, a top cut of d98 of 6 μm.

Treatment of the $CaCO_3$:0.8 wt % of 2-octyl-1-dodecane phosphoric acid mono- and di-ester. The ratio between phosphoric acid mono-ester and phosphoric acid di-ester is 45 mol.-%: 55 mol.-%. The phosphoric acid tri-ester content is below 10 wt.-%:500 g of the spray dried calcium carbonate-containing filler material was added to an MTI Mixer and the sample was activated for 10 minutes at 120° C. and 3000 rpm. Thereafter, 2-octyl-1-dodecane phosphoric acid mono- and di-ester was introduced to the mixer in a quantity of 0.8 wt %. The contents of the mixer were mixed at 120° C. under a stirring speed of 3000 rpm for a period of 10 minutes.

The obtained surface treated filler material product was stored in a closed plastic bag. For analysis purposes the sample was taken out of the closed plastic bag and analyzed immediately. T onset: 275° C.; Water-pick-up: 0.75 mg/g 70% of MA PA1 refers to 70 wt % of a masterbatch of 28 wt % PP HH450 FB homo-polypropylene with MFR 37 g/10 min. (230° C., 2.16 kg, ISO 1133) from *Borealis* and 2 wt % Irgastab FS 301, processing and thermal stabilizer from BASF and 70 wt % of a wet ground surface treated $CaCO_3$ of the prior art, and the $CaCO_3$ has a median particle size diameter d50 of 1.7 μm and a top cut of d98 of 6 μm.

As can be seen from the inventive examples 2 from tables 7 and 8, samples of polypropylene nonwoven fabrics comprises the $CaCO_3$ according to the present invention and as seen in example 3 from tables 7 and 8, samples of nonwoven fabrics comprising the prior art $CaCO_3$ can be produced in good quality with slightly reduced mechanical properties compared to Example 1 being the unfilled polypropylene PP HF420FB.

It lies within the scope of the present invention that the polypropylenes mentioned are not the only one and that other PP polymers or PE polymers or a mix of PP and PE polymers are suitable as well to be used for producing a masterbatch comprising the $CaCO_3$ of the present invention.

The invention claimed is:

1. A polymer composition comprising:
   a) at least one polymeric resin, and
   b) from 0.1 to 95 wt.-%, based on the total weight of the polymer composition, of at least one surface reactive white mineral material treated with at least 0.1 wt.-%, based on the total dry weight of the at least one surface reactive white mineral material, of a phosphoric acid ester blend, wherein the at least one surface reactive white mineral material:
      i) comprises surface reactive white mineral material-containing particles, before treatment with the phosphoric acid ester blend, having a weight median particle size $d_{50}$ of ≤7.5 μm, and a solubility in water at 20° C. (±2° C.) of below 0.1 wt.-%, based on the total dry weight of the surface reactive white mineral material-containing particles, and
      ii) has a moisture pick up susceptibility of ≤0.8 mg/g after treatment with the phosphoric acid ester blend,
      iii) has a volatile onset temperature of ≥250° C. after treatment with the phosphoric acid ester blend, and
      iv) has a hydrophilicity of below 8:2 volumetric ratio of water:ethanol measured at +23° C. (±2° C.) with the sedimentation method after treatment with the phosphoric acid ester blend,
   wherein the phosphoric acid ester blend comprises one or more phosphoric acid mono-ester and one or more phosphoric acid di-ester, and optionally one or more phosphoric acid tri-ester and/or phosphoric acid, wherein the molar ratio of the one or more phosphoric acid mono-ester to the one or more phosphoric acid di-ester in the phosphoric acid ester blend is from 1:1 to 1:100; and
   wherein after treatment with the phosphoric acid ester blend, at least a part of the surface of the surface reactive white mineral material-containing particles comprise the phosphoric acid ester blend of one or more phosphoric acid mono-ester and salty reaction products thereof and one or more phosphoric acid di-ester and salty reaction products thereof, and optionally one or more phosphoric acid tri-ester and/or phosphoric acid and salty reaction products thereof.

2. The polymer composition according to claim 1, wherein the surface reactive white mineral material-containing particles are mineral particles having a brightness R 457 of at least 70% as measured according to ISO 2469.

3. The polymer composition according to claim 1, wherein the surface reactive white mineral material-containing particles are calcium carbonate-containing particles.

4. The polymer composition according to claim 1, wherein the surface reactive white mineral material-containing particles are calcium carbonate-containing particles selected from the group consisting of ground calcium carbonate (GCC), precipitated calcium carbonate (PCC), and mixtures thereof.

5. The polymer composition according to claim 1, wherein the molar ratio of the one or more phosphoric acid mono-ester to the one or more phosphoric acid di-ester in the phosphoric acid ester blend is from 1:1.1 to 1:80.

6. The polymer composition according to claim 1, wherein the phosphoric acid ester blend further comprises one or more phosphoric acid tri-ester and/or phosphoric acid, and after treatment with the phosphoric acid ester blend, at least a part of the surface of the surface reactive white mineral material-containing particles further comprise one or more phosphoric acid tri-ester and/or phosphoric acid and salty reaction products thereof.

7. The polymer composition according to claim 1, wherein
   i) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30 in the alcohol substituent, and/or
   ii) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30 in the alcohol substituent, and/or
   iii) the one or more phosphoric acid tri-ester, if present, consists of an o-phosphoric acid molecule tri-esterified with three alcohol molecules selected from the same or different, unsaturated or saturated, branched or linear, aliphatic or aromatic fatty alcohols having a total amount of carbon atoms from C6 to C30 in the alcohol substituent.

8. The polymer composition according to claim 1, wherein the phosphoric acid ester blend comprises salty reaction products of one or more strontium, calcium, magnesium and/or aluminum salts of phosphoric acid mono-esters and one or more strontium, calcium, magnesium and/or aluminum salts of phosphoric acid di-ester, and optionally one or more strontium, calcium, magnesium and/or aluminum salts of phosphoric acid.

9. The polymer composition according to claim 1, wherein the at least one polymeric resin is at least one thermoplastic polymer.

10. The polymer composition according to claim 1, wherein the at least one polymeric resin is at least one thermoplastic polymer selected from the group consisting of homopolymers and/or copolymers of polyolefins, polyamides, halogen-containing polymers and/or polyesters.

11. A process for preparing a surface reactive white mineral material, the process comprising the steps of:
   (a) providing surface reactive white mineral material-containing particles having a weight median particle size $d_{50}$ of ≤7.5 µm, and having a solubility in water at 20° C. (±2° C.) of below 0.1 wt.-%, based on the total dry weight of the surface reactive white mineral material-containing particles;
   (b) providing a phosphoric acid ester blend comprising one or more phosphoric acid mono-ester and one or more phosphoric acid di-ester, and optionally one or more phosphoric acid tri-ester and/or phosphoric acid, wherein the molar ratio of the one or more phosphoric acid mono-ester to the one or more phosphoric acid di-ester in the phosphoric acid ester blend is from 1:1 to 1:100;
   (c) contacting said surface reactive white mineral material-containing particles of step (a), in one or more steps, with the phosphoric acid ester blend of step (b) such that a phosphoric acid ester blend comprising one or more phosphoric acid mono-ester and salty reaction products thereof and one or more phosphoric acid di-ester and salty reaction products thereof and optionally one or more phosphoric acid tri-ester and/or phosphoric acid and salty reaction products thereof is formed on at least a part of the surface of said surface reactive white mineral material-containing particles of step (a);
   wherein, before and/or during step (c), the temperature is adjusted such that the phosphoric acid ester blend of step (b) is liquid
   wherein, the surface reactive white mineral material after treatment with the phosphoric acid ester blend has a moisture pickup susceptibility of ≤0.8 mg/g, a volatile onset temperature of ≥250° C., and a hydrophilicity of below 8:2 volumetric ratio of water:ethanol measured at +23° C. (±2° C.) with the sedimentation method.

12. The process according to claim 11, wherein the contacting of the surface reactive white mineral material-containing particles with the phosphoric acid ester blend according to step (c) is carried out at a temperature of from 20 to 200° C.

13. The process according to claim 11, wherein
   i) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30 in the alcohol substituent, and/or
   ii) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30 in the alcohol substituent and/or
   iii) the one or more phosphoric acid tri-ester, if present, consists of an o-phosphoric acid molecule tri-esterified with three alcohol molecules selected from the same or different, unsaturated or saturated, branched or linear, aliphatic or aromatic fatty alcohols having a total amount of carbon atoms from C6 to C30 in the alcohol substituent.

14. A method for preparing a fibre and/or filament and/or film and/or thread and/or breathable film comprising at least the steps of:
   a) providing the polymer composition according to claim 1, and b) subjecting the polymer composition of step a) to conditions under which said polymer composition is converted into a fibre and/or filament and/or film and/or thread and/or breathable film.

15. A surface reactive white mineral material obtained by the process according to claim 11.

16. A fibre, filament, film, thread or breathable film comprising the polymer composition according to claim 1.

17. A fibre, filament, film, thread or breathable film comprising the surface reactive white mineral material of claim 15.

18. An article comprising the polymer composition according to claim 1.

19. An article comprising the surface reactive white mineral material according to claim 15.

20. An article comprising the fibre, filament, film, thread or breathable film according to claim 16.

21. An article comprising the fibre, filament, film, thread or breathable film according to claim 17.

22. A method for decreasing the hydrophilicity and/or moisture pick up susceptibility of a surface reactive white mineral material comprising contacting surface reactive white mineral material-containing particles having a weight median particle size of $d_{50}$ of ≤7.5 µm and a solubility in water at 20° C. (±2° C.) of below 1 wt.-%, based on the total dry weight of the surface reactive white mineral material with at least 0.1 wt.-%, based on the total dry weight of the at least one surface reactive white mineral material, of a phosphoric acid ester blend comprising one or more phosphoric acid mono-ester and one or more phosphoric acid di-ester, and optionally one or more phosphoric acid tri-ester and/or phosphoric acid, wherein the molar ratio of the one or more phosphoric acid mono-ester to the one or more phosphoric acid di-ester in the phosphoric acid ester blend is from 1:1 to 1:100, so that a phosphoric acid ester blend comprising one or more phosphoric acid mono-ester and salty reaction products thereof and one or more phosphoric acid di-ester and salty reaction products thereof and optionally one or more phosphoric acid tri-ester and/or phosphoric acid and salty reaction products thereof is formed on at least a part of the surface of the surface reactive white mineral material wherein, the surface reactive white mineral material after treatment with the phosphoric acid ester blend has a moisture pickup susceptibility of ≤0.8 mg/g, a volatile onset temperature of ≥250° C., and a hydrophilicity of below 8:2 volumetric ratio of water:ethanol measured at +23° C. (±2° C.) with the sedimentation method.

* * * * *